Dec. 20, 1960 R. M. HAYES ET AL 2,965,291
CARD PROCESSING SYSTEM
Filed March 12, 1957 10 Sheets-Sheet 10
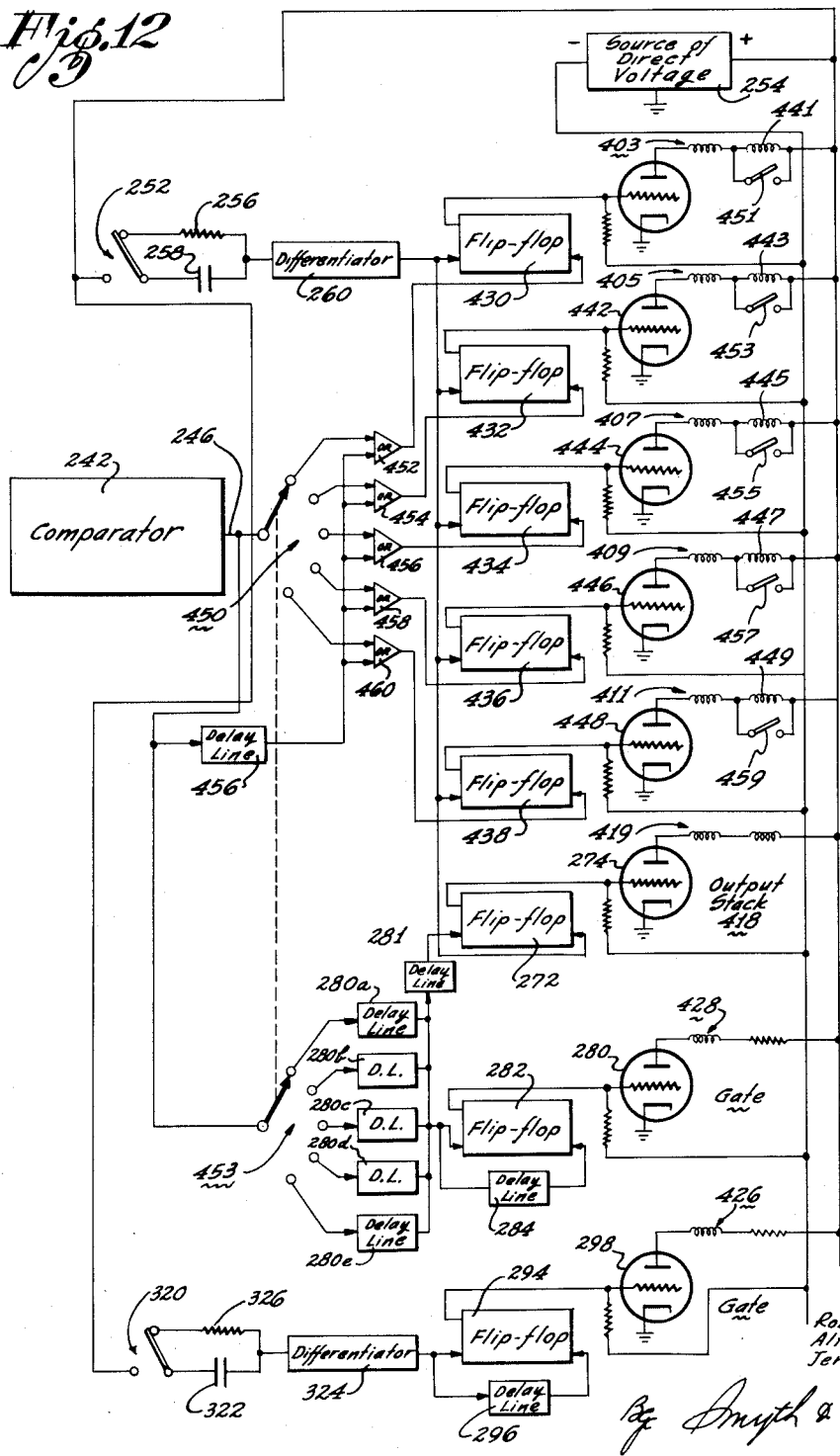
INVENTORS:
Robert M. Hayes
Alfred M. Nelson
Jerome B. Wiener
By Smyth & Roston
Attorneys

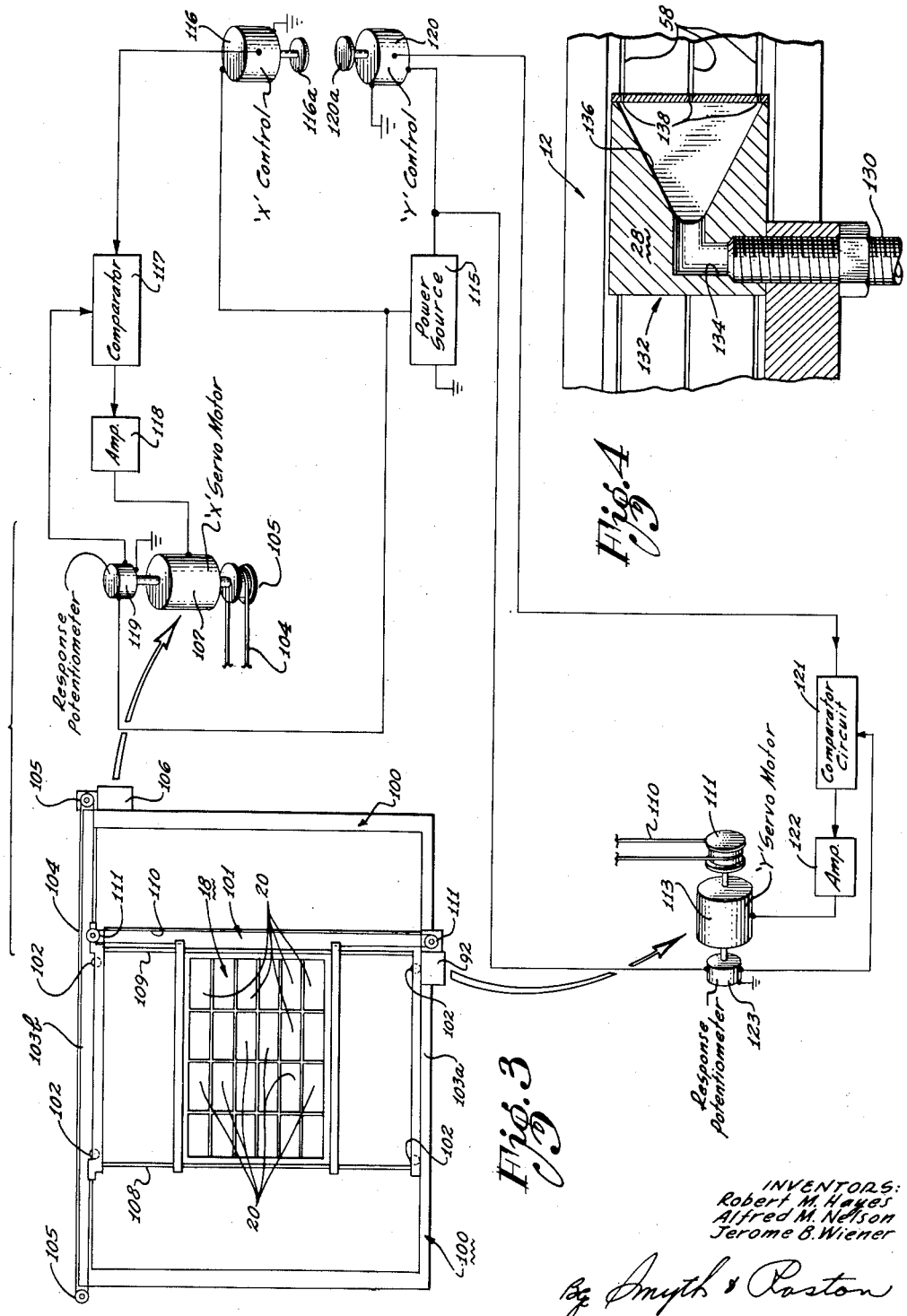

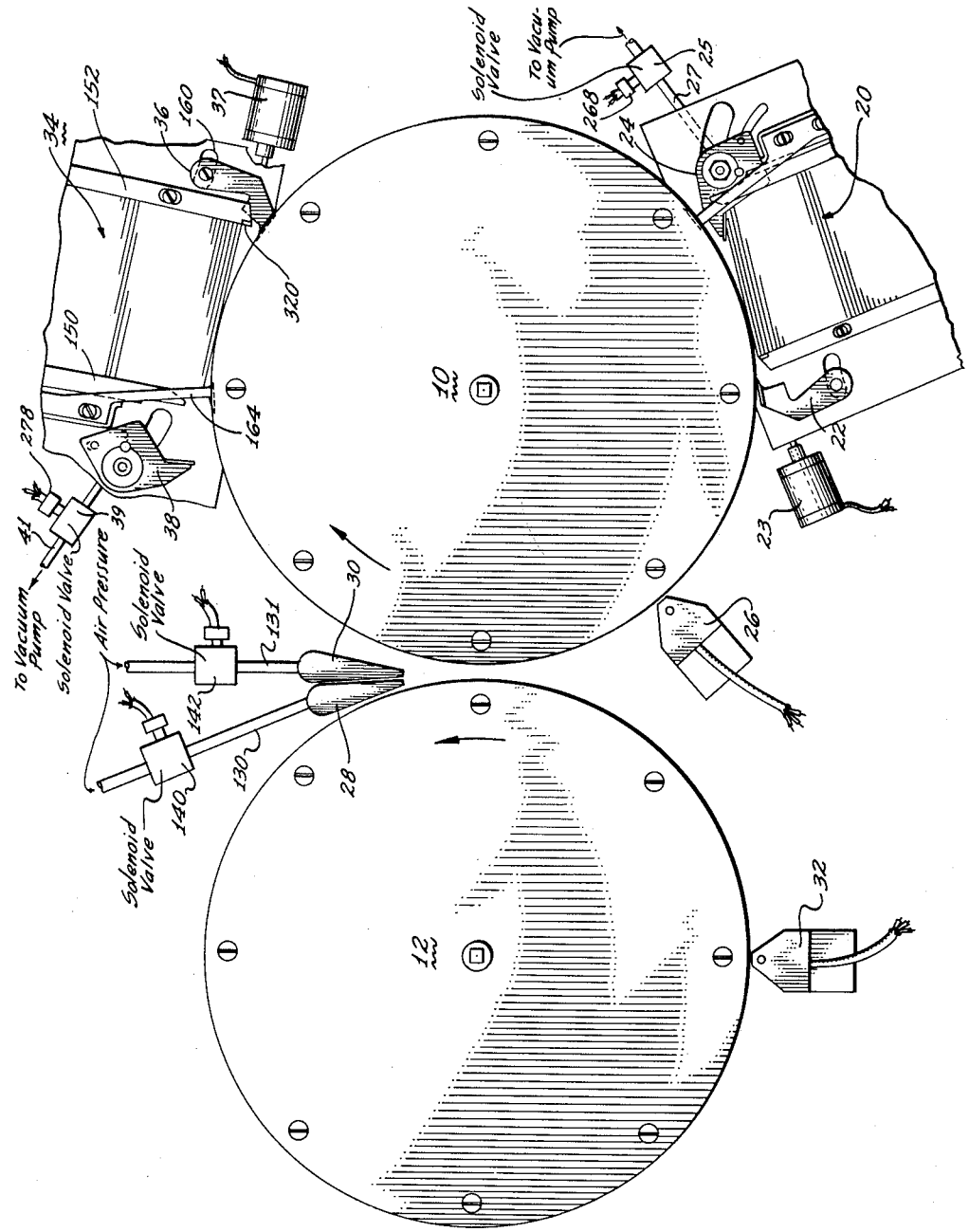

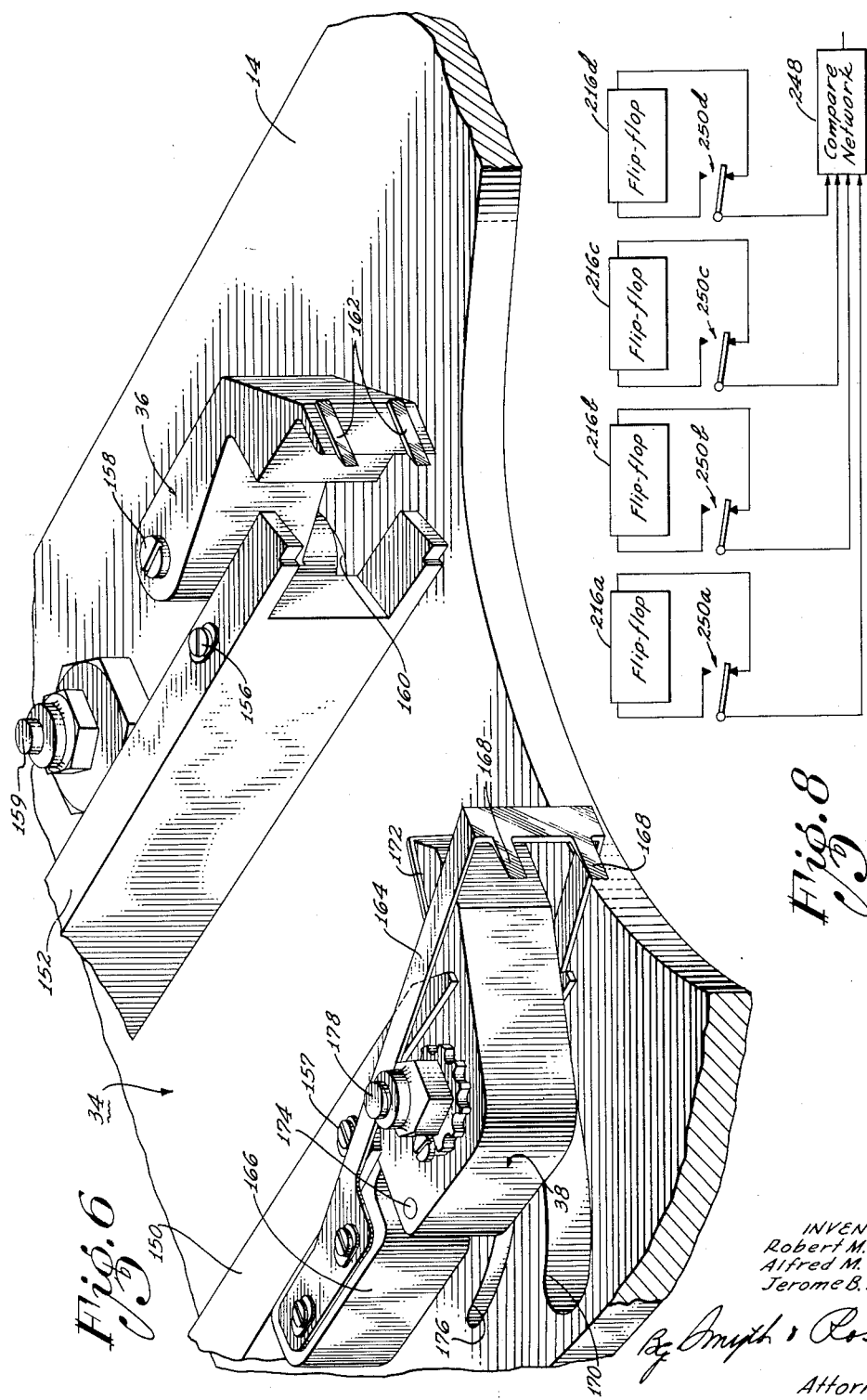

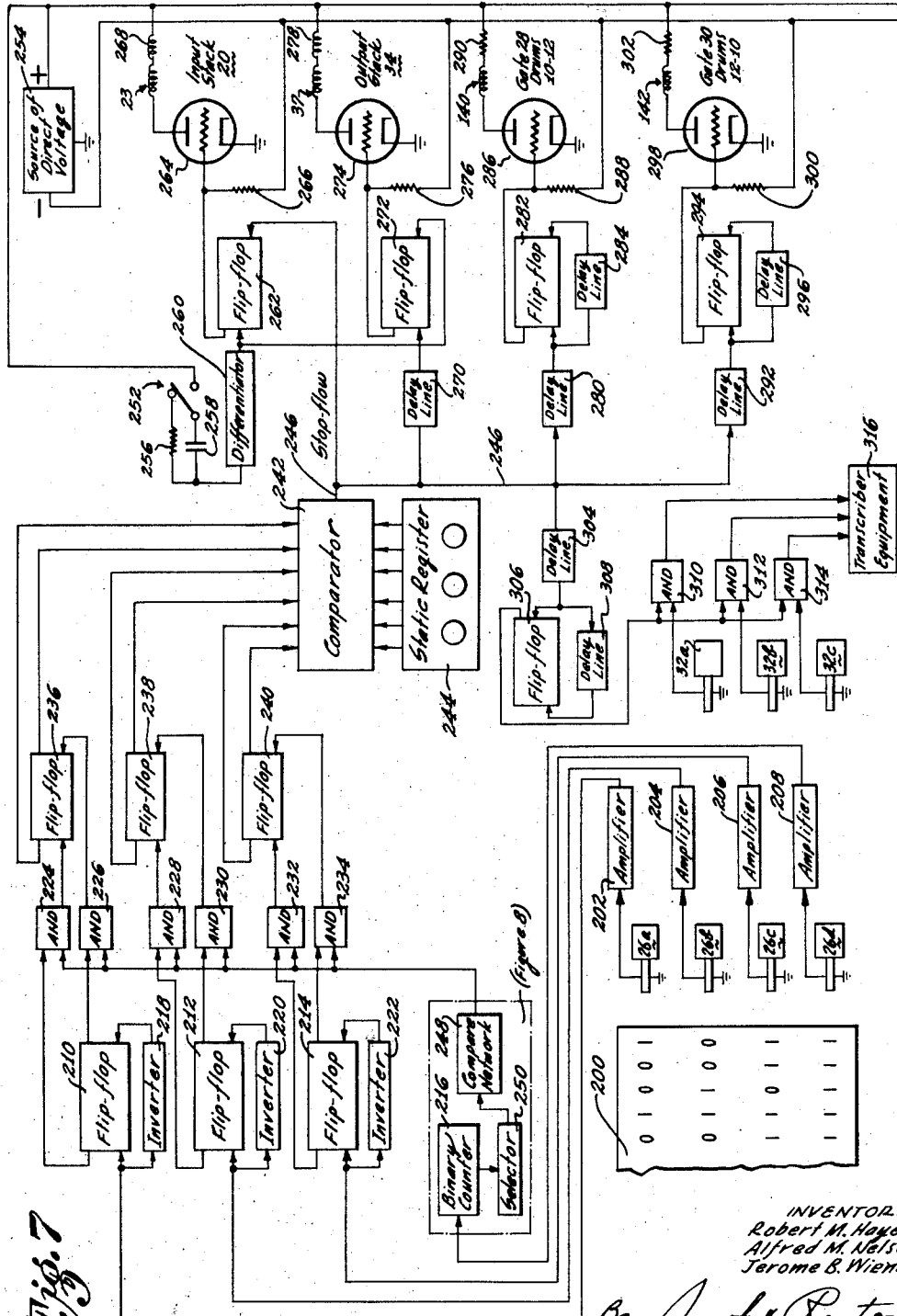

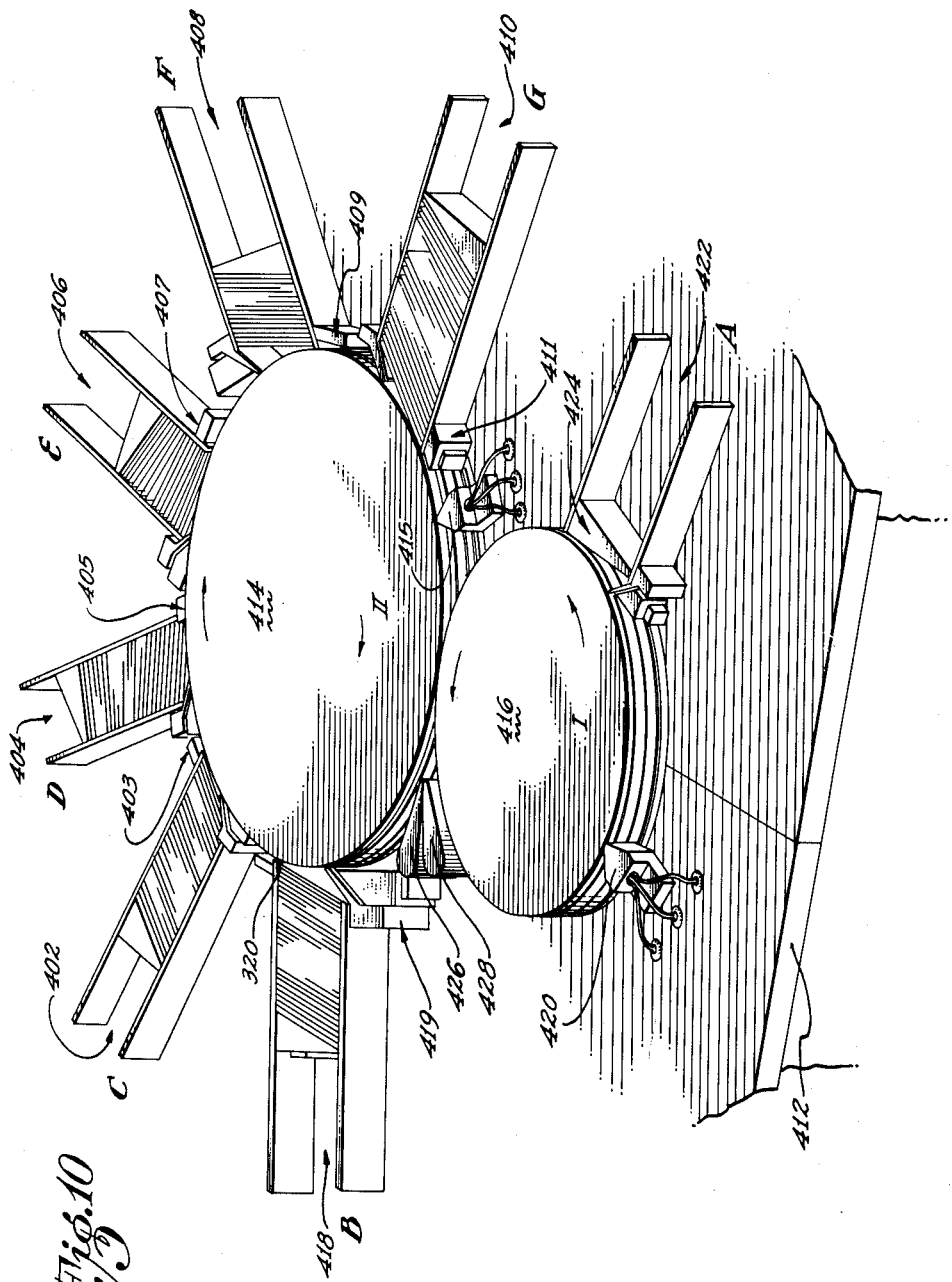

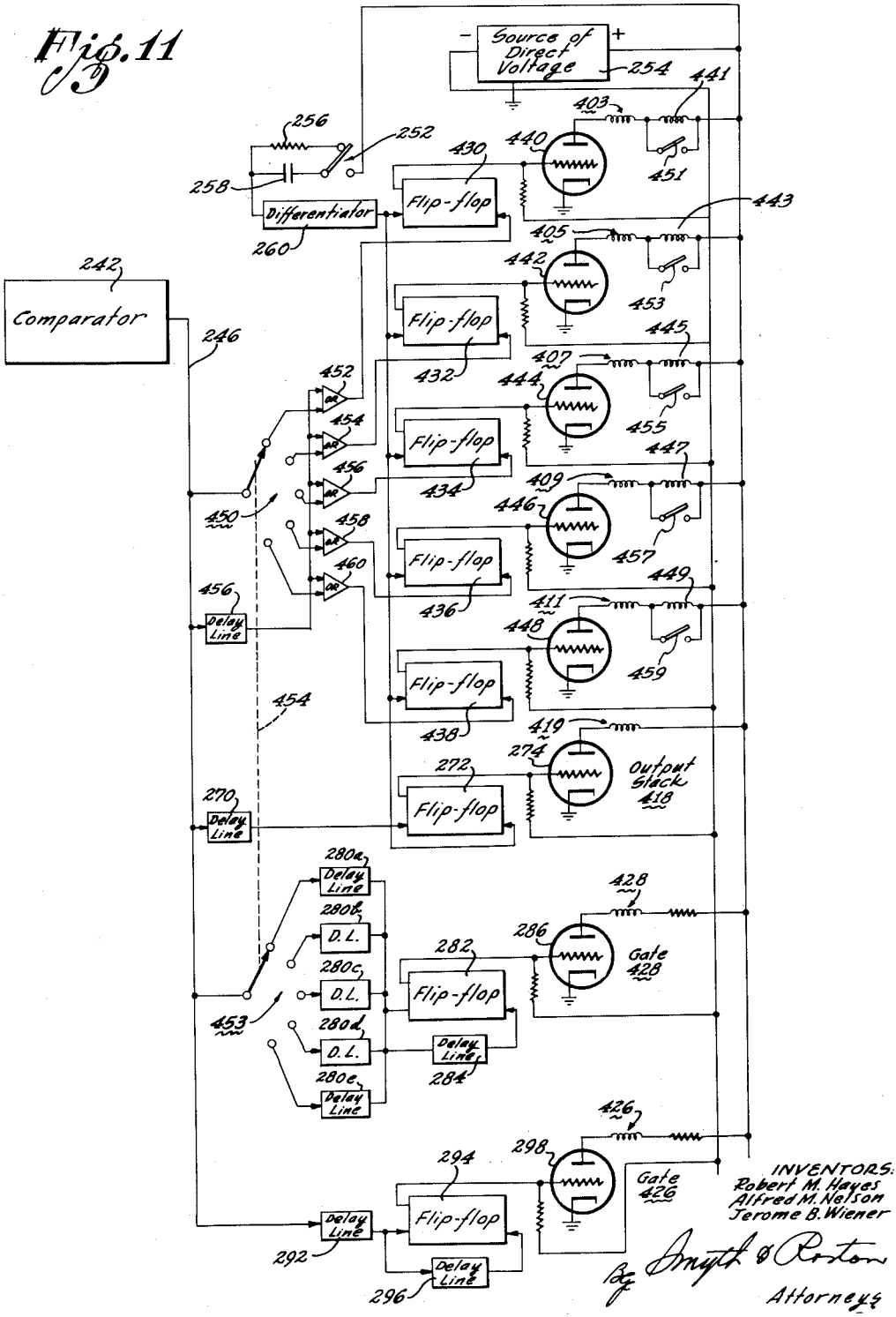

United States Patent Office 2,965,291
Patented Dec. 20, 1960

2,965,291

CARD PROCESSING SYSTEM

Robert M. Hayes, Los Angeles, Alfred M. Nelson, Redondo Beach, and Jerome B. Wiener, Granada Hills, Calif., assignors to Magnavox Company, Los Angeles, Calif., a corporation of Delaware Filed Mar. 12, 1957, Ser. No. 645,640

29 Claims. (Cl. 235—61.7)

The present invention relates to data processing apparatus and systems in which data is stored on a multiplicity of separate cards or similar information-bearing media.

The invention is more particularly concerned with apparatus that is capable of quickly and accurately selecting a desired information card from a file containing a plurality of such cards, and of rendering the selected card available for processing.

The apparatus of the invention is also capable of maintaining a running file of the information cards in which the more active cards are positioned to the front of the file for rapid selection, and in which other sorting operations may be performed on the cards as desired.

Information cards are in general use in data processing systems. These cards usually have data recorded on them in the form of the presence or absence of holes, or by magnetic areas of one polarity or another. The latter type of recording is preferred at the present time insofar as the present invention is concerned. For that reason, the apparatus and system of the invention will be described in conjunction with information cards bearing data in the form of discrete magnetic areas of one polarity or another. By way of a common example, one magnetic polarity may represent the digit "1" for that particular position of the card, and the opposite magnetic polarity may represent the digit "0."

Digital computers and data processing systems have become increasingly prevalent in recent years. Data processing systems, for example, are in general use at the present time for maintaining perpetual inventory controls in the larger department stores. These systems also find general use in banks and similar institutions for maintaining a rapid and readily available system for checking credit. It is evident that an important characteristic of any successful data processing system is that each item of the stored data may be readily and rapidly available, even though millions of such items may be stored in the system.

Many problems have arisen, therefore, in providing a system capable of selecting one or several bits of stored information from the millions of such bits existing in the system and for making this selection on a rapid and accurate basis. In systems using discrete cards as a vehicle for the stored information or data, it is somewhat impractical when a single card is required for processing to select the cards from their stored positions on a one-by-one basis for sequential presentation to the processing means. This impracticality is even more evident in the larger systems in which hundreds of thousands of the information cards may be stored in the file.

Copending application Serial No. 587,055, which was filed May 24, 1955, in the name of Allen P. Algier et al. and which is assigned to the assignee of the present application, discloses and claims a system which represents a practical solution for the problem of rapidly making available a desired item in a particular card, which card is itself stored with thousands of others in the system.

In the system of the copending application, the cards are stored in a magazine in individual groups or stacks. These individual stacks are so arranged that the operator can easily determine in which stack the desired card is situated. Then, by a suitable control, the cards from this stack only are fed to the processing system, and only these cards are processed to reach the desired item on the particular desired card. With such apparatus, there is no need to process all of the cards in the magazine to obtain the desired information, and individual items can be selected much more rapidly than in previous systems.

The cards in the magazine of the copending application may, for example, be divided into individual stacks and each stack may be assigned a numeric or alphabetic interval. It is important, of course, that no two stacks in the magazine contain numbers or letters from the same interval. The cards in the individual stacks of the magazine may be filed in numeric order, if so desired. Alternately, these cards need not be filed in any order at all, or, and as is most desirable, they may be stored in the order of their frequency of use. The embodiment of the present invention for achieving the latter order of the cards in the individual stacks will be subsequently described in detail.

It is evident that any particular card may be selected from the system described above by feeding only those cards from the stack having a numerical interval containing the index of that particular card. Then, of course, only the cards of that particular individual stack are processed so that the desired card may be quickly selected. When the desired card is so selected, the data recorded on it may be read or new data may be inscribed, whichever is desired.

In one embodiment of the present invention, the information cards are stored in a magazine in individual stacks, similar to the arrangement of the copending application described above. The magazine is controllable to present any desired one of the individual stacks to a transporting medium so that the cards in that stack may be processed and the desired card selected.

In another embodiment of the invention, a plurality of stacks (each containing cards of different numeric or alphabetical intervals) are disposed adjacent the transport medium. Suitable controls are provided so that a selected one only of the stacks is activated at any one time to enable a particular desired information card to be made available.

In one mode of operation of the system for selecting a desired card, the cards selected from the activated stack, in either the first or second embodiments described above, are transported in succession past a first group of transducer heads. These heads read the data on the cards and convert this data into electrical control signals. The resulting control signals are utilized in a manner described above and compared with information in a register such as information which is manually set in a static register. This latter information correspond- to that identifying card to be selected. The information cards are in this manner successively scanned and the unwanted cards are deposited one after another in an output stack. This operation continues until the card to be selected is reached. This card is then automatically transferred to a second transporting medium in the illustrated embodiment which carries it past a second group of transducer heads. Of course, other systems can be used for processing the cards. The transferred card is then processed by the second group of transducer heads. Additional data may be added to the card, or data already on the card may be read. These operations, of course, are dictated by the particular requirement of the organization in which the system is used.

When the processing of the transferred card is completed, this card is returned to the original transport medium and in this mode of operation is also fed to the output stack. The output stack is then controlled to return all of the cards to the original individual input stack.

In the mode of operation described above, a card is selected from a particular input stack and is processed, and at the termination of the operation, all the cards are returned to the input stack without disturbing their original order.

In a second mode of operation of the system of the invention, the cards deposited in the output stack are returned to the original input stack while the selected card is being processed on the second transport medium. Then, after that card has been processed, it too is returned to the input stack. This causes the selected card to be returned to a leading position in the input stack, rather than to its original position.

In the second mode of operation described immediately above, the most active cards in any of the input stacks are always positioned toward the front of the stack. This is an important feature of the present invention when it is adapted for this mode of operation. It is evident that the nearer to the front of the input stack that a card happens to be, the more rapidly will that card be rendered available for processing. By disposing the active cards at the front end of each input stack, the average time required to process the cards becomes correspondingly decreased.

The second mode of operation is also extremely useful in situations when only some of a large quantity of cards are processed in any given period and periodic reports are to be made on the processed card. The second mode of operation provides that the processed cards are disposed to the front of the stack and that nonprocessed cards will occur after a processed card in the stack. Therefore, the processed cards are readily available for the periodic reports and there is no need to search through the entire stack for the processed cards.

In the drawings:

Figure 3 is a composite circuit diagram and schematic representation of the magazine illustrated in Figure 1, this figure illustrating certain components which are manually controllable to cause any selected one of the individual stacks of the magazine to be presented to the processing components of the apparatus and system of the invention;

Figure 4 is an enlarged elevational sectional view of a pneumatic gate, this view being substantially on the line 4—4 of Figure 1, and the pneumatic gate being one of a pair used to transfer information cards back and forth between a corresponding pair of rotatable vacuum transport drums in the apparatus of Figure 1;

Figure 5 is a top plan view of one embodiment of the system and apparatus of the invention, this latter representation also being somewhat schematic so as to illustrate the operational principles of the invention;

Figure 6 is a perspective view on an enlarged scale of a fragment of one of the stacks shown in Figure 5 and of the transfer mechanism associated with that stack, this transfer mechanism being controllable to cause cards to be individually selected from the corresponding transport medium and fed to the stack, or vice versa;

Figure 7 is a circuit diagram of a control system for the apparatus of Figure 5, this particular control system causing the apparatus to function in what shall be termed a mode "A" of operation in which the processed cards are returned to their original stack without disturbing their original order in that stack;

Figure 8 is a representation in block form of several of the components of the control system of Figure 7;

Figure 10 is a perspective view of a second embodiment of the invention in which the controllable magazine of Figure 1 is replaced by a plurality of input stacks disposed around a rotatable transport drum, these stacks having individual transfer mechanisms which are controllable so that the cards from a selected one only of the stacks is fed to the drum;

Figure 11 is a circuit diagram of a control system for the embodiment of Figure 10 for causing that embodiment to operate in a first mode corresponding to the "A" mode; and Figure 12 shows a second control system for the embodiment of Figure 10 to produce a second mode of operation corresponding to the "B" mode.

It should be noted that certain components of the electrical control systems illustrated in Figures 3, 7, 8, 9, 11, and 12 are shown merely in block form. This is because the components so illustrated are, in themselves, sufficiently well known to the art so that a detailed circuit representation of them is believed to be unnecessary.

The units illustrated by blocks entitled "flip-flop" are well known bi-stable relaxation circuits. Each of these units may be triggered to what shall be termed its "false" state by the application of a positive pulse to its right input terminal. The trailing edge of such a pulse causes the unit to assume its "false" state in which a relatively high voltage is exhibited at its right output terminal and a relatively low voltage is exhibited at its left output terminal. Contrariwise, the flip-flop unit may be triggered to what shall be termed its "true" state by the introduction of a positive pulse to its left input terminal. The trailing edge of such a pulse triggers the unit and causes a relatively high voltage to be exhibited at its left output terminal and a relatively low voltage to be exhibited at its right output terminal. The flip-flops may be constructed in a manner similar to that described on pages 164 to 166 inclusive of volume 19, entitled "Waveforms," of the Radiation Laboratory Series, published in 1949 by the Massachusetts Institute of Technology.

Units illustrated by the triangular blocks and designated as "or" networks are also believed to be sufficiently well known to the art as to preclude the necessity of a detailed showing of such units. These units have the property of passing any one of a plurality of input signals introduced to its respective input terminals, these input signals each being passed to a common output terminal.

The networks referred to as "and" networks are also well known. Unlike the "or" networks, the "and" networks have the property of passing a signal to their individual output terminals only in the presence of all input signals intended to be introduced to their respective input terminals. "And" networks, for example, are described and shown on page 32 of "Arithmetic Operations in Digital Computers," by R. K. Richards (published by D. Van Nostrand and Company of Princeton, New Jersey, in 1955.

Other components of the control systems, such as delay lines, differentiators, binary counters, and the like, are believed to be sufficiently well known to the electronic art so that further description is demed to be unnecessary.

Figure 1:
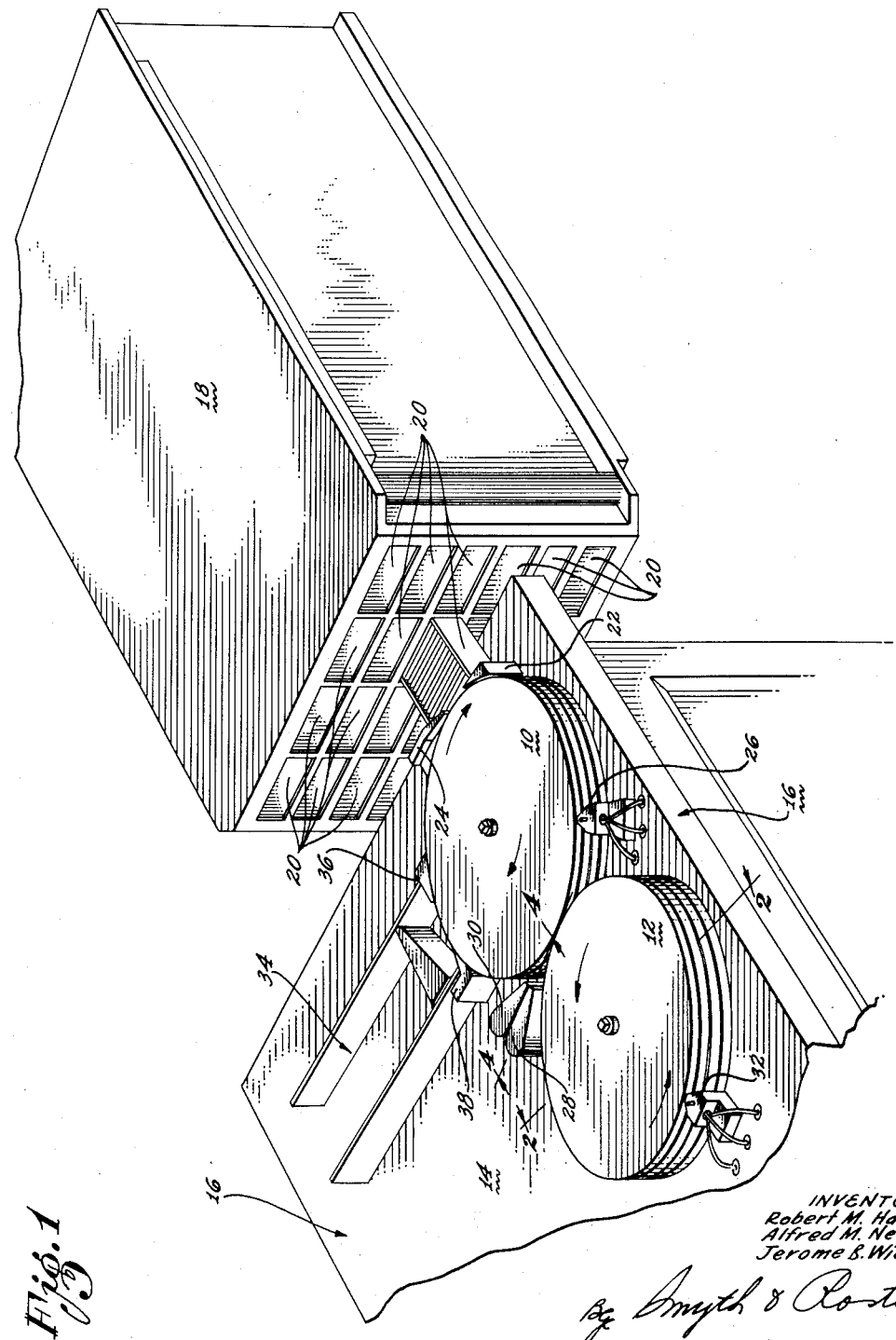
Figure 1 is a somewhat schematic perspective view of one embodiment of the invention and illustrates the disposition of a plurality of individual input stacks in a common magazine such that individual stacks may be controllably presented to the processing components of the apparatus.

The apparatus of Figure 1 includes a pair of vacuum transport drums 10 and 12 which are rotatably mounted in contiguous relation about spaced parallel vertical axes on the top 14 of a table 16. The structural details of these drums will be described in detail subsequently. It is sufficient at this time to point out that the drums exhibit a vacuum pressure at their respective peripheral surfaces. This vacuum pressure enables information cards to be supported by the drums and transported by them from one station to another.

The apparatus also includes a magazine 18 and this magazine, in turn, houses a plurality of individual stacks 20 of the information cards. These individual stacks are supported in the magazine in a series of rows and columns, as illustrated. The stacks are slidable horizontally so that they can be moved in and out of the magazine and against the periphery of the drum 10. The magazine 18 is controllable in a manner to be described so that it can be moved vertically and horizontally. By this control, a selected one of the individual stacks 20 can be brought to an operating position in alignment with a particular station of the drum 10.

As previously noted, each of the individual stacks 20 may contain a plurality of cards representing a selected numeric interval or other particular category of information. The arrangement is such that each stack represents a different numeric interval, and when a particular card is desired, the magazine 18 is controlled to bring the appropriate stack into the operating position.

When the magazine 18 is set to a selected position by a manually operated control, which will be described, the aligned stack 20 may then be manually moved out from the magazine and toward the periphery of the drum 10 into the position illustrated in Figure 1. An adjustable stop member 22 is mounted on the table top 14 and is controllable in a manner to be described so that in one operating position of the stop member, the cards are fed from the aligned stack 20 to the drum 10 in a one-by-one sequence. In another operating position of the stop member 22, any cards that are on the drum 10 are stripped from its periphery and deposited in the stack 20. A retainer member 24 is also mounted on the table top 14, and the aligned stack 20 is moved into an operating position between the retainer 24 and the stop 22.

The information cards may, for example, have the physical shape of a usual pasteboard card measuring 1" by 3" by .007", and these cards are held in the individual stacks in a stacked condition, with the individual cards extending vertically. Then, as the aligned stack is moved outwardly over the table top 14, the cards in that stack are supported by the table top, and the leading card in the stack is moved against the peripheral surface of the transport drum 10.

Appropriate resilient means (not shown) are included in each of the stacks 20. These resilient means bias the cards in each stack forwardly so that they may be urged against the periphery of the drum 10 and held against the periphery as the cards are successively fed to the drum from the aligned stack.

The drum 10 is shown as rotating in a clockwise direction. A suitable transducer means 26 is mounted on the table top 14 and is disposed adjacent the periphery of the drum 10. This transducer means may comprise, for example, a group of reading transducer heads, and these heads read the data recorded on the information cards as these cards are successively transported past the heads by the drum 10.

A pair of pneumatic gate members 28 and 30 are mounted on the table top 14 between the drums 10 and 12 at the contiguous points of these drums. The structural details of these gate members will be discussed in detail subsequently. The member 28 is controlled so that air pressure introduced to that member is directed against the peripheral surface of the drum 10. This air pressure strips the cards from the later drum and causes them to be transferred to the drum 12. In like manner, the member 30 responds to introduced air pressure to strip the cards from the drum 12 and return them to the drum 10.

A second transducing means 32 is mounted on the table top 14 adjacent the periphery of the rotatable drum 12. The transducer means 32 may also comprise a group or series of transducer heads. These heads may be conditioned either to read the data on an information card transported by the drum 12, or to record new data on such a card. The transducer means 26 and 32 may have any appropriate and known construction. For example, these transducer means may be constructed in the manner described in copending application Ser. No. 505,248, filed May 2, 1955, by Alfred M. Nelson and Hans M. Stern.

An output stack 34 is mounted on the table top 14 with its mouth adjacent the transport drum 10. The output stack 34 is angularly displaced slightly from the gate members 28 and 30 in the direction of rotation of the drum 10. This stack is adapted to support the cards in generally vertical planes with their lower surfaces resting on the table top 14. A controllable stop member 36 is supported on the table top at the trailing edge of the stack 34. This stop member will be described in detail subsequently. Briefly, the stop member 36, like the stop member 22, is controllable either to cause the cards to be stripped from the periphery of the drum 10 and deposited in the output stack 34, or to cause the cards in the stack 34 to be fed one after another to the periphery of the drum 10. A retainer member 38 (which will be described in detail) is also mounted on the table top 14, and this latter retainer member is positioned adjacent the leading edge of the stack 34.

When it is desired to select a certain card from the magazine 18 and to process that card, the magazine is first controlled so that the individual stack 20, in whose numeric or alphabetic interval the card appears, is properly aligned and located so that it may be moved forwardly between the guide 24 and the stop 22. The aligned stack is then moved forwardly so that its leading card is brought into engagement with the periphery of the drum 10.

The stop member 22 and the retainer 24 are controlled so that the cards from the positioned stack 20 may be fed one after the other to the periphery of the drum 10. These cards are transported on the periphery of the drum in succession past the transducer means 26. The transducer means 26 scans each successive card and the unwanted cards are transported by the drum 10 past the gate members 28 and 30 to the output stack 34. The stop member 36 and the retainer 38 of the output stack are controlled so that the unwanted cards are sequentially deposited in the output stack.

When the desired card is reached, the transducer means 26 generates appropriate control signals which activate the gate 28 and cause it to transfer the desired card to the drum 12.

Furthermore, as soon as the desired card is scanned by the head 26, the retainer 24 is controlled to terminate the feed of cards from the aligned stack 20. The desired card is transferred by the gate member 28 to the vacuum transport drum 12. One or more cards following the desired card, and which were fed to the drum 10 before the feed was terminated, may also be transferred to the drum 12. Alternately, and as will be described, these trailing cards may be deposited in the output stack 34 with the other unwanted cards. These latter cards trail after the desired card but are not processed.

The transducer means 32 is now conditioned either to read pertinent data on the desired card or to record new pertinent data on that card. This transducer means is appropriately blanked for the cards trailing the desired card so that these latter cards will not be processed. After the desired card has been processed, the gate 30 is activated to return it and its trailing cards (if the latter were transferred to the drum 12) back to the drum 10.

In a first mode of operation, designated mode "A," the desired card and its trailing cards, after processing, are fed to the output stack 34 to join the other cards in that stack. As soon as the processed card and its trailing cards enter the stack 34, the retainer 38 and the stop member 36 are controlled automatically so that all the cards in the stack may be successively fed to the drum 10 and returned to the aligned input stack 20.

The stop 22 is adjusted to a position to cause the cards from the output stack 34 to be stripped from the peripheral surface of the drum 10 and to be returned to the aligned input stack 20. It will be realized that all the cards are now back in the input stack in their original order.

In a second mode of operation of the apparatus and system, the unwanted cards fed to the output stack 34 are returned to the aligned input stack 20 while the desired card is being processed on the transport drum 12. Then, after such processing, the desired card is returned by the gate means 30 to the drum 10. This card is then carried by the drum past the output stack 34 and back to the aligned or positioned input stack 20. In this latter mode, the original order of the cards in the positioned input stack 20 is not restored; rather, the processed card is established at the front of the positioned stack.

In this second mode of operation, the processed cards are always disposed towards the front of the stack. This will provide for the more active cards always to be disposed to the front of the stack. Therefore, on an overall basis, the cards may be more quickly processed since the more inactive cards are continually moved toward the back of the individual stacks 20. Also, and as pointed out previously, this provides for a separation between processed and unprocessed cards in any particular period, and it facilitates reporting for that period.

When the processing of the cards is complete, the particular positioned input stack is moved back to the magazine 18. It will be appreciated that appropriate stationary cover means (not shown) may be provided for maintaining the cards in the individual stacks 20. This cover would enclose the mouths of all the stacks except the one in position.

The individual stacks 20 have been described as being manually movable to an operative position. This is merely for convenience of description. It is evident that any simple and appropriate automatic means may be devised for moving the individual stacks 20 forward and into position against the periphery of the drum 10, as the magazine 18 is brought into a particular controlled operative position.

The vacuum transport drums may be constructed in the manner disclosed, for example, in copending application Serial No. 505,248, filed May 2, 1955, by Alfred M. Nelson and Hans M. Stern. However, the drums are not limited to the particular construction shown in that application. For example, they may also have the form described and claimed in copending application Serial No. 600,975, filed July 30, 1956, by Loren Wilson (now U.S. Patent No. 2,883,189, issued April 21, 1959).

Figure 2:
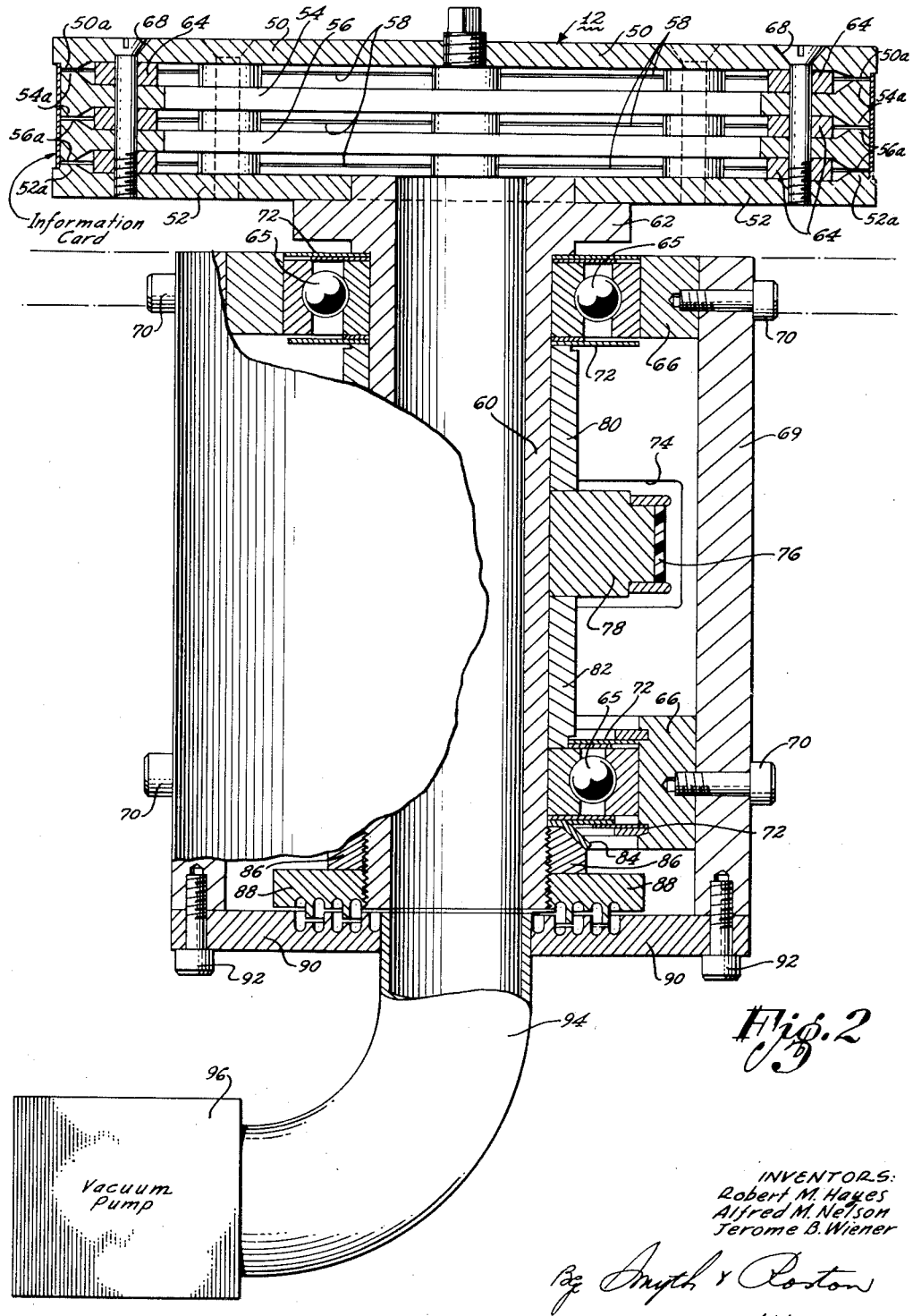
Figure 2 is a somewhat enlarged sectional view substantially on the line 2—2 of Figure 1 and illustrates the constructional details of a rotatable vacuum transport drum which constitutes a component of the apparatus and system of the invention.

The constructional details of the drum shown in Figure 2 are similar to the drums disclosed in the copending application Serial No. 505,248. Only the details of the vacuum transport drum 12 will be described in detail, it being appreciated that the drum 10 may have a similar construction.

As shown in Figure 2, the drum 12 includes a pair of parallel external disk-like cover plates 50 and 52 spaced from one another in a vertical plane. The cover plates define a housing, and they have inwardly disposed annular lip portions 50a and 52a at their respective peripheries. A pair of internal disk-like plates 54 and 56 are disposed within the housing defined by the cover plates, and these internal plates are in spaced parallel relation with each other and with the external plates.

The plates 50 and 52 are fixedly positioned with respect to each other and to the plates 54 and 56 by a plurality of studs 68 extending through all the plates, and the plates are separated by a series of spacers 64 mounted on the studs.

The radius of the internal plates 54 and 56 is slightly less than that of the external plates 50 and 52, and by an amount corresponding substantially to the thickness of the information cards. In this manner, the plates form a channel which extends around the periphery of the drum and which serves to hold the cards on the drum.

Annular flange portions 54a and 56a extend axially from both faces of the plates 54 and 56 at the respective peripheries of the plates. The flange portions 54a and 56a are separated from one another and from the lip portions 50a and 52a on the plates 50 and 52 by relatively small axial distances so as to define a series of peripheral slots 58. The slots 58 communicate with suction passageways formed between pairs of adjacent plates 50, 52, 54 and 56 by the spacers 64.

The drum 12 is mounted in a push fit on a hollow shaft 60, and the drum engages an annular collar 62 provided at one end of the shaft. Bearings 65 are provided at opposite ends of the shaft 60. The inner races of the bearings 65 are mounted on the shaft and the outer races are disposed against bushings 66. The bushings are secured to a housing 69 by a series of studs 70. Seals 72 are disposed at opposite ends of the bearings to prevent leakage of the bearing lubricant. An opening 74 in the housing 69 receives a belt 76 which extends around a pulley 78 secured to the shaft 60. A suitable motor (not shown) drives the belt 76 so as to rotate the shaft 60.

The bearings 65 and the pulley 78 are maintained in fixed axial positions on the shaft 60 by a pair of sleeves 80 and 82 mounted coaxially with the shaft and respectively interposed between the pulley and the bearings. The bearings, pulley and sleeves are held in fixed positions on the shaft 60 by a lock-washer 84 and a nut 86. The nut 86 is adapted to be screwed on a threaded portion at the bottom of the shaft 60. A sealing disk 88 is also screwed on the threaded portion of the shaft 60 below the nut 86. The sealing disk 88 operates in conjunction with a bottom plate 90 of the housing 69 to prevent air leakage between the interior of the housing and the interior of the hollow shaft 60 due to the pressure differential between the housing and the shaft.

The plate 90 is secured to the housing 69 by a plurality of studs 92. A hollow conduit 94 is mounted in a central aperture in the plate 90 in frictional engagement with the plate and in communication with the hollow shaft 60. In this manner, air can be exhausted from the hollow interior of the shaft 60 and through the conduit 94 by a vacuum pump indicated in block form at 96. Therefore, vacuum pressure can be established at the slots 58 at the periphery of the drum 12 to hold the information storage cards in fixed positions on the periphery of the drum as the drum rotates.

As noted above, an appropriate control for the magazine 18 is illustrated in Figure 3. As there illustrated, the magazine 18 is mounted on a support frame 100 for movement in a horizontal or "X" direction and for movement in a vertical or "Y" direction. This is achieved by mounting the magazine in a carriage 101 within the frame 100. The carriage 101 has a series of rollers 102 which move in parallel tracks 103a and 103b constituting part of the frame 100. The carriage 101 may be moved reciprocally in a horizontal direction in the tracks 103a and 103b by a drive arrangement which includes a cord 104 looped around a pair of pulleys 105.

The pulleys 105 are rotatably mounted at opposite ends of the frame 100, with the opposite ends of the cord 104 being fixed to the carriage 101 at spaced positions on the carriage. The pulleys 105 are disposed at substantially the same vertical level at positions near the top of the frame 100, and they may be rotated in either direction by the operation of an appropriate means indicated in block form at 106 in Figure 3. These means may include a servo-motor 107 which is shown schematically in Figure 3 as being coupled mechanically to one of the pulleys 105.

Vertical motion of the magazine 18 is obtained by slidably mounting it on a pair of spaced guide bars 108 and 109. These guide bars are vertically disposed in parallel relationship to each other so as to constitute side members of the carriage 101. The magazine 18 is movable up and down along the guide bars 108 and 109 by means of a cord 110 which is looped around a pair of pulleys 111 mounted at the bottom and top of the carriage 101 in a substantially vertical plane. The opposite ends of the cord 110 are attached to the carriage 101 at spaced positions on the carriage. The pulleys 111 are rotatable in either direction by the operation of a suitable means indicated in block form at 92 in Figure 3. This latter means may include a servo-motor 113 for moving the magazine in a vertical direction.

When the servo-motor 107 becomes energized, it operates to drive the magazine 18 in a horizontal or "X" direction towards the left or right in Figure 3. The motor 107 operates to move the magazine 18 in this manner by rotating the pulleys 105 so as to produce a displacement of the cord 104. Similarly, the motor 113 operates, when energized, to move the magazine 18 upwardly or downwardly in a vertical or "Y" direction by driving the pulleys 111 to produce a displacement of the cord 110. Therefore, by properly energizing the servo-motors 107 and 113, any particular one of the individual stacks 20 can be brought into alignment with the guide 24 and the stop 22 of Figure 1. The aligned stack may then be displaced into an operative relation with the drum 10 in the manner described.

A convenient way of controlling the servo-motors 107 and 113 is to connect each of these motors in a closed servo-loop. When this is done, any particular "X" or "Y" position can be obtained by setting a calibrated manual control for each position to the proper value. For such an arrangement, a power source 115 is connected to one stationary contact of a potentiometer 116 having its other stationary contact grounded. This potentiometer is designated as the "X" control. The movable contact of the potentiometer 116 is manually adjustable as by a control knob 116a. The movable contact of the potentiometer 116 is electrically connected to the input terminal of a comparator 117.

Another input terminal of the comparator 117 is connected to the movable contact of a response potentiometer 119. One stationary contact of the potentiometer 119 is grounded and the other stationary contact is connected to the same terminal of the power source 115 as the potentiometer 116. The movable contact of the potentiometer 119 is mechanically coupled to the motor 107 for rotation in accordance with the operation of the motor. The operation of the motor 107 is controlled by signals introduced to the motor through an amplifier 118 from the comparator 117.

In like manner, a potentiometer 120 (designated the "Y" control), a comparator 121, an amplifier 122 and a potentiometer 123 are electrically connected to one another to control the operation of the servo-motor 113. The potentiometer 120, and its control knob 120a, the comparator 121, the amplifier 122 and the potentiometer 123 may be provided with characteristics similar to those respectively provided for the potentiometer 116, the comparator 117, the amplifier 118 and the potentiometer 119. Moreover, these latter components may be associated with one another and inter-connected in a manner similar to the association and interconnections of the former components.

Since the operation of servo-circuits in geenral is well understod in the art, a brief explanation of the operation is believed to be sufficient. The "X" control potentiometer 116 may be set to any desired position by manual adjustment of the knob 116a. This causes the voltage on the movable contact of the potentiometer 116 to become correspondingly varied so as to produce an unbalance between this voltage and the voltage on the movable contact of the potentiometer 119.

Because of the unbalance in voltages from the potentiometers 116 and 119, a signal representing the unbalance is produced by the comparator 117. This signal causes the motor 107 to turn until the voltage on the movable contact of the potentiometer 119 becomes equal to the voltage introduced to the comparator 117 from the movable contact of the potentiometer 119. This equality prevents any drive signal from being introduced to the motor 107 such that the motor stops. Since the magazine 18 is moved by the operation of the motor 107, the magazine may be adjusted to a desired position in the horizontal direction corresponding to the desired one of the stacks 20 that is to be brought into an operative position.

Likewise, the "Y" control potentiometer 120 can be set to a selected position to produce a corresponding rotation of the "Y" servo-motor 113 by a desired amount. This provides the appropriate adjustment of the magazine 18 in a vertical direction to bring the selected one of the stacks 20 into final alignment. Therefore, and in the manner described, the magazine 18 can be positioned so that any one of the stacks 20 can be brought into vertical alignment with the table top 14 and into horizontal alignment with the guide 20 and the stop 22. Moreover, this control is effectuated merely by the appropriate manipulation of the control knobs 120a and 116a. It is evident that these control knobs can be suitably calibrated so that any desired one of the stacks 20 can be quickly brought into position.

It should also be appreciated that the particular type of magazine 18 shown in the drawings and described above is only illustrative. For example, a rotary type of plural-stack magazine can be used. The rotary magazine can be adjusted to position by rotating it about a central axis and moving it axially along that axis to bring any desired one of its stacks into operative position. Moreover, and in an embodiment to be described, the magazine 18 may be replaced by a plurality of individual input stacks which are disposed at selected angular positions about the drum 10 and which are selectively controllable to feed their cards to the drum.

It should also be pointed out that the particular servo control mechanism described above is merely illustrative and that other controls can be used. For example, servo mechanisms are known in which any desired ordinate and co-ordinate position can be achieved by the manipulation of a single dial that may be appropriately calibrated. Alternately, and for automatic control, an appropriate number may be set up in a register which, in turn, provides the desired control for the servo system. Also, step-type servo systems may be used with position locks for accurately aligning the positioned stacks with the transfer mechanism.

The gate members 28 and 30 may be similar in their construction to the pneumatic gate described and claimed in copending application Ser. No. 562,154, filed January 30, 1956, by Stuart L. Peck and Loren R. Wilson. Since these gate members may be similar in their construction, only the details of the gate 28 are shown in the sectional view of Figure 4 and will be described.

As previously noted, the gate 28 directs its stream of air against the periphery of the drum 10 to transfer cards from that drum to the drum 12. The gate 30, on the other hand, directs its stream of air toward the peripheral surface of the drum 12 to return the cards from the periphery of the drum 12 back to the drum 10.

The gate 28, for example, includes a feed line 130, and it also includes a housing generally indicated at 132. The housing 132 is provided with a teardrop configuration and is disposed so that the thin end of the housing is directed at the periphery of the drum 10. The housing 132 of the gate has a configuration which is generally symmetrical about a center line. The housing is disposed relative to the drums 10 and 12 so that the line of symmetry, when extended, is essentially tangential to the drum 10. The housing 132 has a passageway 134 which communicates with the feed line 130. The housing also has a mouth portion 136 which communicates with the passageway 134. The mouth portion 136 has a generally conical configuration. Holes 138 are provided at the thin front end of the housing 132 and these holes extend through the housing to the mouth portion 136. The holes or apertures 138 are in respective axial alignment with the peripheral slots 58 in the transport drum 12.

When air under pressure is fed to the feedline 130, this air passes through the feedline and through the passageway 134 into the mouth portion 136 of the unit. This causes streams of air to issue from the holes 138 in the thin end of the housing. The streams of air have a relatively high velocity because of the small diameter of these holes. The streams of air impinge, therefore, on the periphery of the drum 10 with a relatively great force.

The streams of air, in effect, exert a shearing force between the periphery of the drum 10 and the cards on the drum such that these cards are removed from the drum. This removal of the cards brings them under the influence of the vacuum pressure at the periphery of the drum 12. After becoming attracted to the drum 12, the cards remain fixedly positioned on the periphery of the latter drum during the drum rotation because of the vacuum pressure exerted on the periphery of that drum.

During the operation of the gate 30, the gate 28 is inactive. The gate 28 may later be activated so that it may function in a similar manner to return the cards from the drum 12 to the drum 10. During the activation of the gate 28, the gate means 30 is inactivated.

Turning now to the schematic representation of the apparatus shown in Figure 5, it will be seen that a solenoid valve 140 is included in the feedline 130 to the gate member 28, and that a solenoid valve 142 is included in the equivalent feedline 131 which extends to the gate 30. The solenoid valves 140 and 142 may have any usual and suitable construction. These valves are controlled so that, when their solenoid portions are energized, the valves are opened and air pressure is introduced to their corresponding gates. Therefore, merely by selectively energizing the solenoid valves 140 and 142, the gate members 28 or 30 can be placed in operation.

An aligned and positioned input stack 20 of the magazine 18 is also shown in Figure 5. The adjustable stop member 22 is shown in somewhat greater detail and is controlled by a solenoid 23 as is the retainer 24. The arrangement is similar to that disclosed and claimed in copending application Ser. No. 645,639, filed March 12, 1957, and will be described in detail in conjunction with Figure 6. It is believed sufficient at this time to point out that, when the solenoid 23 is energized, the stop 22 is withdrawn from the periphery of the drum 10 by an amount sufficient to permit one card to pass between it and the periphery of the drum and the retainer 24 is moved into the stack. Therefore, when the solenoid 23 is in an energized condition, the positioned stack 20 becomes an input stack, and cards may be fed successively from it to the periphery of the drum 10. The retainer 24 is coupled to a vacuum pump (not shown) by an air feedline 27. A solenoid valve 25 is interposed in the feedline. When the solenoid portion of the valve 25 is energized, the vacuum pressure to the retainer 24 is cut off and the cards are free to move from the positioned stack 20 to the periphery of the drum 10. However, when the solenoid valve is not energized, the valve is open and a vacuum pressure is established at the surface of the retainer 24 contacting the leading card in the stack. This vacuum pressure serves to retain the cards in the stack.

When the solenoid 23 is not energized, the stop 22 is moved against the periphery of the drum 10 and the retainer 24 is retracted. In this latter position, the cards on the drum 10 may be stripped from the drum by the stop member and, in a manner to be described, deposited in the stack 20. In this latter position of the stop member 22 and retainer member 24, the stack 20 is converted to an output stack.

The stop member 36 and retainer 38 associated with the output stack 34 are controlled by a solenoid 37 in a manner similar to the control of the retainer 24 and stop member 22 by the solenoid 23. Whenever the solenoid 37 is energized, the retainer 38 is moved into position, the stop 36 is retracted, and the stack 34 functions as an input stack. However, when the solenoid is not energized, the retainer 38 is retracted and the stop 36 is moved to a position to cause the cards to be stripped from the drum 10 and deposited in the stack 34 in a manner to be described. A feedline 41 couples the retainer 38 to a vacuum pump (not shown), and a solenoid valve 39 is interposed in this feedline. The vacuum pressure to the retainer 38 is interrupted when the solenoid valve 39 is energized.

Details of the output stack 34 and its transfer mechanism are further illustrated in Figure 6, and the illustrated mechanism may be similar in its construction to the transfer mechanism associated with the positioned input stack 20. The transfer mechanism illustrated in Figures 5 and 6 includes the retainer 38, the stop member 36 and ancillary controls. This stack and transfer mechanism may, as previously mentioned, be similar to that disclosed and claimed in copending application Serial No. 645,639.

As described in the copending application in full detail, and as shown in Figures 5 and 6, the stack 34 may be defined by a pair of parallel walls 150 and 152 supported on the table top 14. These walls are separated from each other by a distance slightly greater than the length of each of the cards used in the system. The cards are supported in the stack 34 in generally vertical planes between the walls 150 and 152, and with their lower edges resting on the table top 14.

The wall 152 is secured to the table top 14 by suitable screws such as the set screw 156. The wall 150 is affixed to the table top by screws, such as the set screws 157. The walls 150 and 152 extend in a generally radial direction outwardly from the periphery of the drum 10. The leading edge of the wall 152 has a bifurcated configuration to receive the stop member 36. The stop 36 is mounted on an operating lever arm which is not shown in Figure 6 and which extends under the table top 14. The stop member is mounted on the lever arm by means of a stud 158, and the lever arm is pivotally mounted on the underside of the table top 14 by a shaft 159. The shaft 159 is mounted on the table top in any suitable manner to extend downwardly from the table top at right angles to it. The stop 36 is movable in an arcuate slot 160 in the table top 14. The operating lever of the stop is cam-actuated in a manner fully described in the copending application Serial No. 645,639, so that the stop may be moved to a retracted standby position shown in Figure 6 in which it is moved clear from the periphery of the drum 10 and so that the stop 36 may be moved into the bifurcated end portion of the wall 152 to an operating position.

The stop 36 has a pair of fingers 162 which are adapted to extend into peripheral slots adjacent the annular orifices in the drum which have been described. When the stop 36 is in its forward position shown in Figure 5, the leading edge of a card transported on the drum 10 to the stop rides up over the fingers 162 so that such a card is arrested by the stop. On the other hand, when the stop 36 is moved to its retracted standby position shown in Figure 6, cards are free to move on the periphery of the drum 10 past this stop.

A lifter assembly 164, shaped as a hollow rectangle, is supported on a mounting block 166 adjacent the outer side of the wall 150. The member 164 extends obliquely inwardly across the wall 150 and towards the periphery of the drum 10. The member has a pair of fingers 168 which, like the fingers 162, extend into the peripheral slots in the drum 10. The fingers 168 are bulged outwardly from the drum at their intermediate portions. Therefore, cards on the periphery of the drum 10 ride up and over the fingers 168 and through the rectangular lifter 164. The end of the lifter 164 adjacent the drum, and which is integral with the fingers 168, is displaced from the wall 152 a distance slightly less than the length of the cards. Therefore, when the stop 36 is moved forwardly into its operating position, the cards arrested by that stop have their trailing edges projecting over the end and through the body portion of the lifter 164. These trailing edges are displaced radially from the periphery of the drum. Therefore, the next succeeding card on the drum moves up and between the drum and the preceding card supported on the lifter. This assures that each following card will deposit a preceding card in the stack 34, and that the cards will not get out of order in the stack.

The retainer 38 is also mounted on a lever arm (not shown), and which is pivoted to the underside of the table top 14. The retainer is movable by the lever arm between an operating position and a standby position in an arcuate slot 170 in the table top. The end of the wall 150 adjacent the drum 10 is also bifurcated, so that the retainer may be moved from its standby position forward through the end portion of the wall 150 to its operating position.

The retainer 38 has a face 172 which engages the trailing portion of the front face of the leading card in the stack 34 when the retainer is in its operative position.

In a manner fully described in the copending application Serial No. 645,639, the retainer 38 includes an internal valve which closes as the retainer is moved back to its standby position. The closure of this valve is effected by means of a stud 174 which moves in an arcuate slot 176 in the table top 14. This stud 174 causes the retainer 38 to rotate about a central shaft 178 to close the internal valve when the retainer is retracted to its standby position.

Full details of the stack 34 and its transfer mechanism may be found in the copending application Serial No. 645,639. It is believed sufficient for present purposes to point out that the station is controlled by a solenoid such as the solenoid 37 of Figure 5. When this solenoid is energized, a suitable cam drive is actuated so that the levers associated with the stop 36 and with the retainer 38 may be controlled to retract the stop to its standby position and to move the retainer 38 forward to is operating position. The station is then in the condition illustrated in Figure 6. Now, and by the successive energizing of the solenoid valve 39 of Figure 5, cards may be successively fed from the stack 34 to the periphery of the drum 10.

When the solenoid 37 is not energized, the station including the stack 34 assumes the condition illustrated in Figure 5. In this latter condition, the retainer 38 is withdrawn to a standby position, and its internal valve is closed in the manner fully described in copending application Serial No. 645,639. This enables the solenoid winding 278 of the solenoid valve 39 of Figure 5 to be deenergized and the valve to be opened without a loss in vacuum pressure in the line 41. As fully described in the copending application, this permits the line 41 to be used in common with other stations without the vacuum pressure being lost by any inactivated stations.

When the station of the stack 34 is in the condition shown in Figure 5, the stop 34 deposits cards from the periphery of the drum 10 into the stack in the described manner.

The transfer mechanism associated with the positioned input stack 20 may, as noted above, be operated in the same manner as the transfer mechanism of the stack 34. That is, the solenoid 23 of Figure 5 may be energized to retract the stop 22 and to simultaneously move the retainer 24 to its operating position. The retainer 24 may now be controlled by the solenoid valve 25 successively to feed cards from the positioned stack 20 to the periphery of the drum 10. Alternately, and when the solenoid 23 is not energized, the stop 22 is moved to its operating position and the retainer 24 is simultaneously withdrawn to its standby position. In this latter condition of the elements 22 and 24, the cards transported on the periphery of the drum 10 are deposited in the positioned stack 20 in the described manner.

It should be appreciated that the control apparatus shown in Figures 5 and 6 and described above is included only by way of example. For example, the control apparatus described in co-pending application Serial No. 538,111 filed October 3, 1955, by Robert M. Hayes et al. (now U.S. Patent No. 2,842,362, issued July 8, 1958) may also be used to obtain the transfer of information cards into a stack at particular times and to obtain the withdrawal of information cards from the stack at other times.

The control system in Figure 7 is one which is capable of causing the system to operate in its first mode of operation, as described above. That is, the control system of Figure 7 causes the cards fed to the output stack 34 to remain there until the selected card is processed and likewise fed to that stack. Then, all the cards are returned to the positioned one of the input stacks 20 without disturbing the original order of the cards in that stack.

The control system of Figure 7 includes a group of heads 26a, 26b, 26c and 26d positioned adjacent the drum 10 in a manner similar to the transducer means 26 in Figure 5. The heads 26a, 26b, 26c and 26d are adapted to perform the function of the transducer means 26 shown in Figure 5. The heads 26a, 26b, 26c and 26d scan the information cards such as the card 200 as the cards are transported by the drum 10 past the heads.

As previously noted, the information cards such as the cards 200 may contain desired data or information which is preferably recorded on the cards in the form of small areas or dots of one magnetic polarity or the other. These dots are arranged in a series of horizontal rows along the cards, with the rows placed one under the other so as to form a plurality of vertical columns along the card. Each of these vertical columns corresponds to a position of the card. The bottom row of data contains the magnetic dots of one polarity only so as to provide clock signals for the system.

In the illustrated embodiment, three rows of data and a row of clock signals are shown. It is evident that more or less rows may be used, depending upon the amount of information desired. Each of the transducer heads 26a, 26b and 26c is positioned to scan a different row of data on the card. Since the number of such heads may correspond to the number of rows, three heads are shown only by way of example. The transducer head 26d scans the bottom or clock row to produce clock signals.

The transducer heads 26a, 26b, 26c and 26d are connected respectively to the input terminals of a series of amplifiers 202, 204, 206 and 208. The output terminals of the amplifiers 202, 204 and 206 are connected to the left input terminals of a series of flip-flops 210, 212 and 214. The output terminal of the amplifier 208 is connected to a binary counter 216. The output terminals of the amplifiers 202, 204 and 206 are also respectively connected to a series of inverters 218, 220 and 222. The output terminals of the inverters are connected to the respective right input terminals of the flip-flops 210, 212 and 214.

The left and right output terminals of the flip-flop 210 are connected respectively to a pair of "and" networks 224 and 226. The left and right output terminals of the flip-flop 212 are similarly connected to a pair of "and" networks 228 and 230. Finally, the left and right output terminals of the flip-flop 214 are connected respectively to an "and" network 232 and to an "and" network 234.

The "and" network 224 is connected to the left input terminal of a flip-flop 236, and the "and" network 226 is connected to the right input terminal of that flip-flop. In similar manner, the "and" network 228 is connected to the left input terminal of a flip-flop 238, whereas the "and" network 230 is connected to the right input terminal of that flip-flop. Similarly, the "and" network 232 is connected to the left input terminal of a flip-flop 240, and the "and" network 234 is connected to the right input terminal of the latter flip-flop.

The output terminals of the flip-flops 236, 238 and 240 are all connected to a comparator 242. A static register 244 is also connected to the comparator 242.

The comparator 242 is shown in block form for the purpose of simplicity, as is the static register 244. Actually, the comparator is formed from a plurality of "and" and "or" networks which are interrelated in a logical pattern. The comparator can be constructed and operated in a manner similar to that disclosed in Patents 2,155,825 to Haselton; 2,364,540 to Luhn; 2,484,081 to Dickinson; 2,501,821 to Kouzmine; 2,580,768 to Hamilton; 2,615,127 to Edwards; 2,641,696 to Woolard; 2,674,727 to Spielberg and 2,679,638 to Bensky.

The static register may be any known type of manually operated instrument, such as a patchboard, which is capable of developing any desired pattern of voltages across its output terminals. The comparator 242 functions to compare the pattern of voltages from the static register with the pattern indicated by the flip-flops 236, 238 and 240 to develop an output pulse on a lead 246 connected to its output terminal when the two patterns represent, for example, the same binary number.

The binary counter 216 is connected to a compare network 248, as is a selector 250. The output terminal of the compare network is connected to each of the "and" networks 224, 226, 228, 230, 232 and 234. The combination of the units 216, 248 and 250 and their structural components will be described in detail in conjunction with Figure 8. The selector 250 may be adjusted so that the compare network 248 passes an output pulse to the "and" networks 224, 226, 228, 230, 232 and 234 at a selected count on the binary counter 216 corresponding to a selected column on each of the cards such as the card 200.

The system includes a manually operated single-pole, double-throw start switch 252. One of the fixed contacts of the start switch 252 is connected to the positive terminal of a source 254 of direct voltage. This source also has a negative terminal and a grounded intermediate terminal. The other fixed contact of the switch 252 is connected to one terminal of a discharge resistor 256. The movable arm of the switch is connected to a capacitor 258 which, in turn, is connected to the other terminal of the resistor 256 and to a differentiator circuit 260. The differentiator may be constructed in a manner similar to that described on page 2–27 to 2–38, inclusive of "Principles of Radar," second edition, published by the Massachusetts Institute of Technology.

The other terminal of the differentiator 260 is connected to the left input terminal of a flip-flop 262. The left output terminal of this flip-flop is connected to the control grid of a triode 264. A resistor 266 connects this control grid to the negative terminal of the source 254.

The cathode of the triode is connected to ground. The anode of the triode is connected to one terminal of the energizing winding of the solenoid 23 associated with the transfer mechanism of the positioned input stack 20. The energizing winding 268 of the solenoid valve 25 (Figure 5) connects the other terminal of this winding to the positive terminal of the source 254. In the manner described, whenever the windings of the solenoids 23 and 25 are energized, the transfer mechanism associated with the positioned input stack 20 causes the cards to be fed from the positioned input stack to the periphery of the drum 10. However, when the energizing windings of the solenoids 23 and 25 are not energized, the transfer mechanism is conditioned to strip cards from the periphery of the drum 10 and deposit them in the positioned stack 20.

The lead 246 from the comparator 242 is connected to the right input terminal of the flip-flop 262. This lead is also connected to a delay line 270 which, in turn, is connected to the left input terminal of a flip-flop 272. The differentiator 260 is connected to the right input terminal of this latter flip-flop.

The left output terminal of the flip-flop 272 is connected to the control grid of a triode 274. A resistor 276 connects this control grid to the negative terminal of the source 254. The cathode of the triode 274 is connected to ground, and the anode of this triode is connected to one terminal of the energizing winding of the solenoid 37 associated with the output stack 34. The energizing winding 278 of the solenoid valve 39 (Figure 5) connects the other terminal of this winding to the positive terminal of the source 254.

The lead 246 is also connected to a delay line 280, and this latter delay line is connected to the left input terminal of a flip-flop 282. The delay line 280 is also connected to a delay line 284 whose output terminal is connected to the right input terminal of the flip-flop 282.

The left output terminal of the flip-flop 282 is connected to a resistor 288 whose other terminal connects with the negative terminal of the source 254. The cathode of the triode 286 is connected to ground. The anode of this triode is connected to one terminal of the energizing winding of the solenoid valve 140. This valve controls the air pressure to the gate 28 which, in turn, controls the transfer of cards from the drum 10 to the drum 12. The winding is connected to a resistor 290 which, in turn, is connected to the positive terminal of the source 254.

The lead 246 is also connected to a delay line 292. This latter delay line is connected to the left input terminal of a flip-flop 294 and to the input terminal of a delay line 296. The output terminal of the delay line 296 connected to the right input terminal of the flip-flop 294. The left output terminal of the flip-flop 294 is connected to the control grid of a triode 298. A resistor 300 connects this control grid to the negative terminal of the source 254. The cathode of the triode 298 is grounded, and the anode is connected to the energizing winding of the solenoid valve 142. This latter solenoid valve, as described, controls the air pressure to the gate 30 which, in turn, controls the return of cards from the drum 12 to the drum 10. A resistor 302 connects the winding 142 to the positive terminal of the source 254.

The lead 246 is also connected through a delay line 304 to the right input terminal of a flip-flop 306 and to the input terminal of a delay line 308. The output terminal of the delay line 308 is connected to the left input terminal of the flip-flop 306, and the right output terminal of the flip-flop 306 is connected to a series of "and" networks 310, 312 and 314. A series of transducer heads 32a, 32b and 32c are connected respectively to the "and" networks 310, 312 and 314. The signals from the heads 32a, 32b and 32c may be applied to the "and" networks 310, 312 and 314 through suitable amplifier stages (not shown). These latter heads correspond to the transducer means 32 of Figure 1 and are positioned adjacent the drum 12 to process the selected card. The "and" networks 310, 312 and 314 are connected to suitable transcriber equipment 316.

The transcriber equipment in the illustrated embodiment utilizes in known manner the data or information recorded on the selected card and it may take any well known structural configuration. Likewise, this equipment may be used to transcribe new data or information on the selected card, in which event the connections between it and the heads 32a, 32b, 32c through the "and" networks 310, 312 and 314 would be reversed.

After the magazine 18 of Figure 1 is controlled to bring the desired one of the stacks 20 into position, and when that stack has been placed in the position shown in Figure 5, the switch 252 is manually operated from its illustrated position so as to initiate the operation of the system. This switch may, for example, be in the form of a spring-biased push button which is normally urged to its illustrated position.

When the switch 252 is depressed, it produces across the capacitor 258 a voltage which has a transient nature. This capacitor is originally in a discharge state due to the fact that the resistor 256 is connected across it when the switch 252 is in its illustrated position. The transient voltage pulse appearing across the resistor 258 is sharpened in the differentiator 260 so as to have a relatively steep trailing edge. This trailing edge of the pulse triggers the flip-flop 262 to its "true" condition in which a relatively high voltage appears at its left output terminal. At the same time, the flip-flop 272 is triggered to its "false" state so that a relatively low voltage appears at its left output terminal.

The relatively high voltage at the left output terminal of the flip-flop 262 causes the triode 264 to become conductive so that a current flows through the energizing winding of the solenoid 23 of the transfer mechanism associated with the positioned input stack 20. At the same time, the triode 274 is rendered nonconductive by the false state of the flip-flop 272 so that no current flows through the energizing winding of the solenoid 37 associated with the output stack 34.

The resulting current flow through the triode 264 also flows through the winding 268 to close the solenoid valve 25 and interrupt the vacuum pressure at the retainer 24. This current also flows through the energizing winding of the solenoid 23 to retract the stop 22 and to move the retainer 24 forward into the position shown in Figure 5. This causes cards to be fed continuously from the input stack 20 to the drum 10.

Moreover, no current flows through the energizing winding of the solenoid 37 or through the winding 278, because the triode 274 is non-conductive. Therefore, the retainer 38 is retracted and the stop 36 is moved forward, as shown in Figure 5. The valve 39 is open, but the vacuum pressure may be shut off by an internal valve in the retainer 38. This latter valve closes in the manner described in the copending application Ser. No. 645,639 when the retainer 38 is moved to its illustrated position. The cards on the drum 10 may now be selected and stacked in the output stack 34 in the previously described manner.

It will be assumed now that a particular column of data is selected on each card, and that the static register 244 is set up so that the voltages at its output terminals represent a binary number equal to the binary number represented by the desired card at its selected column. The selected column on the card is established by the manual control of the selector 250.

Now, as the cards are continuously and successively fed from the positioned input stack 20 to the periphery of the drum 10, these cards are transported in succession past the heads 26a, 26b, 26c and 26d. Each card is scanned by these heads, and the flip-flops 210, 212 and 214 are triggered into operating positions corresponding to the rows of data on the successive cards. The inverters 218, 220 and 222 assure that the flip-flops will be triggered regardless of their preceding individual states. However, the triggering of the flip-flops 210, 212 and 214 is ineffective insofar as the rest of the system is concerned except for the selected position of each card, as established by the selector 250. This is because a pulse is passed by the compare network 248 from the binary counter 216 only for the selected position. The pulse passed by the compare network 248 activates the "and" networks 224, 226, 228, 230, 232 and 234. This causes the "and" networks 224, 226, 228, 230, 232 and 234 to pass information from the flip-flops 210, 212 and 214 to the flip-flops 236, 238 and 240 only at the selected position.

The flip-flops 236, 238 and 240 are constrained, therefore, to assume individual operating conditions corresponding to the column of data on each card at the selected position. The operational states of these flip-flops is sensed by the comparator 242. However, the comparator does not produce an output pulse until the data represented by the selected column of a card corresponds to that previously set in the static register 244. When this occurs, a pulse appears on the lead 246 indicating that the desired card has been reached.

This pulse on the lead 246 is immediately introduced to the right input terminal of the flip-flop 262 to trigger that flip-flop back to its "false" state. This causes the triode 264 to become nonconductive. This terminates the current flow through the winding 268, and the valve 25 opens. The resulting vacuum pressure at the retainer 24 interrupts the feed of cards from the positioned input stack to the periphery of the drum 10. Shortly after, the now deenergized solenoid 23 causes the stop 22 to be moved into position and the retainer 24 to be retracted.

The pulse on the lead 246 is delayed by the delay line 280 a sufficient time to enable the selected card to pass from the heads 26a, 26b, 26c and 26d to a position approaching the gate 28. The delay line 280 then introduces the pulse to the left input terminal of the flip-flop 282 to render the triode 286 conductive and to pass a current through the winding of the solenoid valve 140 so as to render the gate 28 effective.

The gate 28, therefore, transfers the selected card from the drum 10 to the drum 12 in the described manner. It might be pointed out that the feed from the input stack 20 is arrested after the desired card has reached and passed the heads 26a, 26b, 26c and 26d. There are, therefore, one or more cards trailing the desired card, which trailing cards were fed to the drum 10 from the stack 20 before the solenoid 23 was deenergized to stop the feed. These trailing cards in the embodiment of Figure 7 are permitted to be transferred to the drum 12 by the gate 28 and to trail after the desired card as it is circulated on the latter drum. The delay line 284 returns the flip-flop 282 to its "false" state to discontinue the operation of the gate 28, and the time delay of this latter delay line is sufficient to permit not only the desired card, but also the trailing cards, to be transferred to the drum 12.

The desired card is then circulated on the drum 12 past the group of heads 32a, 32b and 32c for processing, and the processed information is fed to the transcriber equipment 316. The delay line 304 functions to pass the pulse from the lead 246 to the right input terminal of the flip-flop 306 to trigger that flip-flop to its "false" state. The delay of the delay line 304 is such that the flip-flop 306 is so triggered to its "false" state at the time that the desired card is reaching the heads 32a, 32b and 32c. In this way, the "and" networks 310, 312 and 314 become activated to pass information to the transcribed 316 for the desired card. The delay line 308 permits the flip-flop 306 to remain in its "false" state only while the desired card is moving past the heads 32a, 32b and 32c and before the cards trailing the desired cards reach the heads. By triggering the flip-flop 306 to the true state before the cards trailing the desired card reach the heads 32a, 32b and 32c only the information from the desired card becomes transcribed.

As shown in Figure 7, all of the information on the selected card may be introduced to the transcriber equipment 316. Actually, only the information at particular positions on the selected card may be introduced to the transcriber equipment 316. This may be accomplished by using stages corresponding to the stages 216, 248 and 250 to activate the "and" networks 310, 312, and 314. The "and" networks 310, 312, and 314 may a so be activated only upon the occurrence of certain information in the selected card by using stages corresponding to the comparator 242 and the static register 244. Furthermore, although the equipment 316 is shown as being a transcriber, other types of equipment can also be used. For example, the equipment can be a duplicator or it can be a recorder for transferring information to the card instead of operating as a transcriber to receive information from the card.

The pulse on the lead 246 is passed through the delay line 292 to the left input terminal of the flip-flop 294. The delay in the delay line 292 is such that the flip-flop 294 is triggered to its "true" state when the processed card has circulated with the drum 12 past the heads 32a, 32b and 32c, and when this card is approaching the gate 30. When the flip-flop 299 is triggered to its "true" state, the triode 298 is rendered conductive so that the solenoid valve 142 is operated to activate the gate 30. The delay line 296 permits the flip-flop 294 to remain in its "true" state long enough so that not only the processed card, but also the cards trailing this processed card, are returned to the drum 10. The processed and trailing cards are now transported by the drum 10 to the stack 34 and are deposited in that stack.

Therefore, when the switch 252 is depressed and released, the cards from the positioned input stack 20 are successively fed to the drum 10 and are transported by the drum and sequentially deposited in the output stack 34. This continues until the desired card is reached. That desired card is transferred by the gate 28 to the drum 12 for processing. The desired card is followed by several trailing cards which also circulate on the drum 12, but which are not processed. After the processing of the desired card, the gate 30 is activated such that the processed and trailing cards are returned to the drum 10 and deposited in the output stack 34.

When the operations described above have been completed, the delay line 270 passes the pulse from the lead 246 to the left input terminal of the flip-flop 272. This triggers the flop-flop to its "true" state and causes the triode 274 to become conductive. When the triode 274 is rendered conductive, current flows through the winding of the solenoid 37 and through the winding 278 of the solenoid valve 39. Therefore, the ouput stack 34 is transformed in the described manner into a feeding or input stack and the valve 39 is closed to cut off the vacuum pressure to the retainer 38.

The cards in the stack 34 are then successively fed in the described manner to the periphery of the drum 10 to be transported back to the positioned input stack 20. As described above, and since the solenoid 23 is now de-energized, the transfer mechanism of the positioned input stack 20 functions to transfer the cards back to that input stack.

At the completion of the operation described above, the cards are all returned to the input stack 20 in their original order. The control system is now in condition for another cycle which may be initiated by setting the selector 250 and the static register 244 to the desired values and by subsequently depressing the push button start switch 252.

Details of the binary counter 216 and of the selector 250 and the compare network 248, as previously noted, are shown in Figure 8. The binary counter 216 may be formed from a plurality of flip-flops 216a, 216b, 216c and 216d. The selector 250 may be formed from a plurality of single-pole, double-throw switches 250a, 250b, 250c and 250d. The fixed contacts of the switches are respectively connected to the left and right output terminals of the associated flip-flops, and the movable arms of the switches are respectively connected to the compare network 248.

As will be seen from Figure 8, for any particular setting of the movable arms of the switches, they will have a relatively high voltage only when the corresponding flip-flops have a particular pattern of operational states. For example, a relatively high voltage appears on the movable arm of the switch 250a only when the flip-flop 216a is in its "true" state. Likewise, high voltages appear on the movable arms of the switches 250b and 250c when the flip-flops 216b and 216c are in their "true" state, and a relatively high voltage appears on the movable arm of the switch 250d only when the flip-flop 216d is in its "false" state. Only when the flip-flops have these particular states in the illustrated embodiment, will the compare network pass a signal to its output lead. As will be seen, the compare network may be a conventional type of "and" network in this embodiment.

The flip-flops 216a, 216b, 216c an 216d may be connected in known manner to constitute the binary counter 216. The binary counter is successively triggered as each card is scanned. The switches 250a, 250b, 250c and 250d may be set to any desired pattern corresponding to any selected count established in the binary counter. This count may correspond to the desired column on the cards to be read. Although four flip-flops are shown in the binary counter, more or less can be used, depending upon the number of columns on each card.

Figure 9:
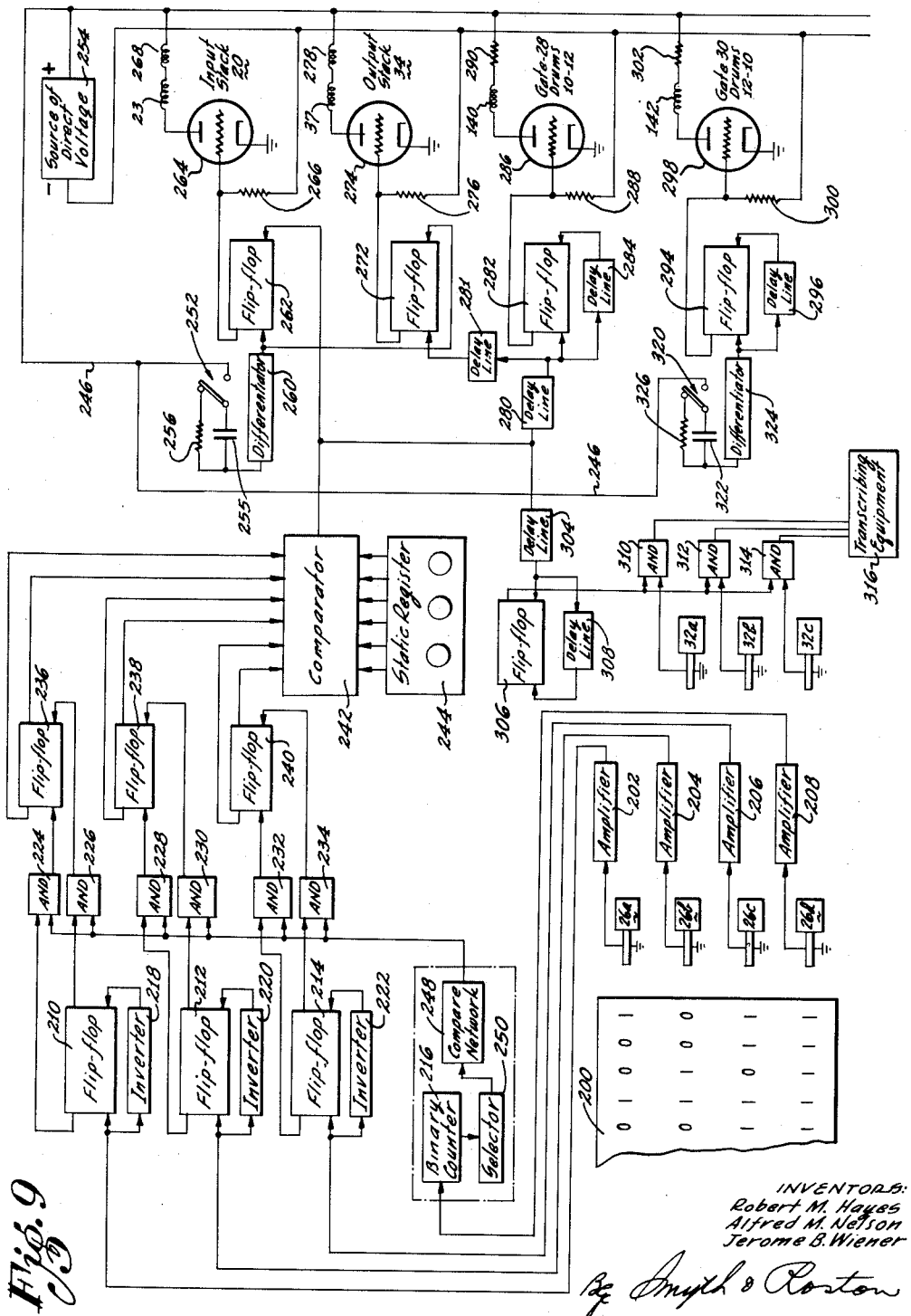
Figure 9 shows a control system for the apparatus of Figure 5, this functioning in a mode "B" of operation, in which the cards are returned to the input stack in such a manner that the selected and processed card assumes the leading position in the stack.

The control system shown in Figure 9 is similar in most respects to that of Figure 7. Because of this, like components have been reperesented by like numerals. The control system of Figure 9 controls the system of Figure 5 in accordance with the second mode of operation. It will be remembered that, in that second mode, the cards originally transported to the output stack 34 are returned to the positioned input stack 20 while the selected card is being processed, and the selected card is returned last to the positioned input stack. The purpose of this is to position the selected card at a leading position in the stack so that the active cards will always be disposed toward the front of the stack to facilitate rapid selection and processing.

In the control system of Figure 9, the left input terminal of the flip-flop 272 is connected through a delay line 281 to the output terminal of the delay line 230 instead of being connected to a delay line 270 as in Figure 7. In the embodiment shown in Figure 9, a small switch is mounted at the mouth of the output stack 34, and this switch may, for example, be of the "Micro Switch" type, such as is manufactured by the Minneapolis-Honeywell Company of Minneapolis, Minnesota. The switch is represented at 320 in Figures 5 and 9 and is of the single-pole, double-throw type. The switch is actuated, for example, by the edge of the leading card in the output stack 34. So long as there is a card in that stack, the switch 320 is held in its illustrated position. However, when the last card leaves the output stack 34, the switch 320 is spring biased so that its movable arm becomes disposed against its lower contact.

The lower fixed contact of the switch 320 is connected to the positive terminal of the source 254. The movable arm of the switch is connected to a capacitor 322 which, in turn, is connected to the input terminal of a differentiator 324. The differentiator 324 may be similar in its construction to the differentiator 260 described previously. A discharge resistor 326 is connected to the upper fixed contact of the switch 320 and to the common junction of the capacitor 322 and the differentiator 324. The output terminal of the differentiator 324 is connected to the left input terminal of the flip-flop 294. This left input terminal of the flip-flop 294 was connected to the delay line 292 in the embodiment of Figure 7.

As before, the operation of the control system is initiated by actuating the switch 252. Now, the first card to enter the output stack 34 moves the switch 320 to its illustrated position. The switch 320 is thereafter held in its illustrated position so long as there are cards in the output stack.

As soon as the desired card is reached and the comparator 242 develops a pulse on the lead 246, the delay line 280 passes the pulse to the flip-flop 282 to actuate the gate 28. However, in this embodiment, the delay of the delay line 284 is made such that only the desired card is transferred from the drum 10 to the drum 12. The trailing cards are, therefore, passed to the stack 34. The delay line 280 also passes the pulse to the delay line 281. The output pulse from the delay line 281 passes to the left input terminal of the flip-flop 272 to trigger that flip-flop to its "true" state. This conditions the transfer mechanism of the output stack 34 to feed the cards from the output stack to the periphery of the drum 10. The delay of the delay line 281 is sufficient to enable the trailing cards to be deposited in the stack 34 before its transfer mechanism is so conditioned.

Therefore, while the desired card is being processed on the drum 12, the cards originally fed to the output stack 34 are sequentially returned to the drum 10 and transported back to the input stack 20. It will be noted that, upon reaching the desired card, the transfer mechanism of the positioned stack 20 is conditioned, as before, to interrupt the feed of cards to the drum and to enable the positioned stack to receive the card transported to it by the drum 10.

While the cards in the stack 34 are being returned to the positioned stack 20, the desired card circulates on the drum 12, and the desired card is processed as before by the heads 32a, 32b and 32c. The flip-flop 306 is triggered to its false state for a selected interval controlled by the delay lines 304 and 308. This interval is chosen so the desired card will be processed by the heads only on its first circulation or pass by the drum 12 past the head. The desired card continues to circulate on the drum 12 until all the cards have been returned by the stack 34 to the positioned stack 20. No further processing occurs, however, because the delay line 308 returns the flip-flop 306 to its "true" state at the end of the selected interval and the "and" networks 310, 312 and 314 are no longer conditioned for translation of signals to the transcribing equipment 316. As in the previous embodiment, other types of equipment may be substituted for the transcriber.

Now, when the last card leaves the stack 34 for return to the stack 20, the switch 320 is moved down on its lower contact. This causes a pulse to be developed across the capacitor 322. This pulse is differentiated in the differentiator 324 to have extremely steep leading and trailing edges. The trailing edge of the pulse is used to trigger the flip-flop 294 to its "true" state so that the gate 30 is activated to return the processed card from the drum 12 to the drum 10. The delay line 296 holds the gate 30 activated for one complete revolution of the drum 12 to assure that the card on the drum 12 is returned to the drum 10.

Therefore, when the last card has left the stack 34, the card on the drum 12 is transferred back to the drum 10 to be returned to the positioned input stack 20. Because the stack 34 is conditioned to feed cards to the drum, the cards transferred from the drum 12 are free to pass under the mouth of the now empty stack 34 and back to the positioned input drum 20.

When the system operates in this second mode, the more active cards are maintained toward the front of the stacks 20 for the reasons previously described.

In the embodiment of the invention shown in Figure 10, the magazine of Figure 1 is replaced by a plurality of stacks 402, 404, 406, 408 and 410. These stacks are positioned on a table top 412 around a relatively large drum 414. The drum 414 is rotatably mounted on the table top 412, and the stacks 402, 404, 406, 408 and 410 are positioned at spaced angular positions around the periphery of the drum 414.

Since the drum 414 may be constructed in a manner similar to the construction of the vacuum transport drum 12 of Figure 2, it is believed unnecessary to describe in detail the constructional details of this drum. Likewise, each of the stacks 402, 404, 406, 408 and 410 supports the cards in a manner similar to the stack 34 in Figure 1. That is, the cards are supported in each of the latter stacks in a generally vertical position and with their lower edges resting on the table top 412. Suitable biasing means are provided in each of the stacks so that the cards are continually urged towards the front of the respective stacks.

The stacks 402, 404, 406, 408 and 410 have respective transfer mechanisms 403, 405, 407, 409 and 411 respectively associated therewith for controlling the transfer of cards from the individual stacks to the peripheral surface of the drum 14, and vice versa. These transfer mechanisms may be similar to the mechanism shown in Figure 6, and as described in conjunction with the output stack 34 and the positioned input stack 20 in the embodiment of Figures 1 and 5. That is, each of the transfer mechanisms 403, 405, 407, 409 and 411 is controllable so that the respectively corresponding stacks are conditioned either to feed cards to the drum or to select cards from the drum. When the stacks are not in use they are each actuated to a condition to feed cards to the drum 414. However, their respective retainers are activated to exert a vacuum pressure against the corresponding leading card to retain the cards in the various stacks. This permits cards transported by the drum 414 to pass under and past the mouth of any stack that is not in use at that particular time.

Transducer means 415 similar to the transducer means 26 of Figure 1 are mounted on the table top 412 and are positioned adjacent the periphery of the drum 414 to scan the information cards transported by that drum. A second drum 416 is rotatably mounted on the table top 412 in contiguous relationship with the drum 414 and is adapted to serve the same function as the drum 12 of Figure 1. The transducer means 415 are positioned adjacent the drum 414 between the stack 410 and the position of transfer of cards from one drum to the other.

An output stack 418 is also positioned on the table top 14 with its mouth adjacent the periphery of the drum 414. The output stack 418 is similar to the stack 34 of Figure 1 and is positioned between the stack 402 and the position of transfer of cards between the drums 414 and 416. The stack 418 has a transfer mechanism 419 associated with it, and this transfer mechanism is similar to the mechanism associated with the output stack 34 of the embodiment of Figure 1.

Transducer means 420 are mounted on the table top 412 and are positioned adjacent the periphery of the rotatable drum 416. The transducer means 420 are provided to process the selected card transported on the drum 416. The transducer means 420 are adapted to perform the same function as the transducer means 32 of Figure 1. The drum 416 has an output stack 422 positioned adjacent its periphery. The purpose of this stack will be described. The stack 422 has a transfer mechanism 424 which is controllable to feed cards to and from the stack and the drum 416.

A pair of pneumatic gates 426 and 428 are positioned between the drums 414 and 416. The gate 428 may be activated to transfer cards from the drum 414 to the drum 416 in a manner similar to the gate 28 of Figure 1. The gate 426, on the other hand, may be activated to return the cards from the drum 416 to the drum 414.

In the embodiment of Figure 1, the magazine 18 was first positioned to place a selected stack 20 in operative relationship with the drum 10. In the embodiment of Figure 10, the equivalent operation is carried out by conditioning one of the stacks 402, 404, 406, 408 and 410 to feed its cards successively to the drum 414. This is done by energizing the solenoid valve associated with the retainer of the particular stack. This cuts off the vacuum pressure to the retainer, as previously described, and it enables the conditioned stack to feed the cards successively to the periphery of the drum 414.

The output stack 418 is initially conditioned to receive and stack such cards fed to the periphery of the drum 414 as were not selected by the gate 428 for transfer to the drum 416. The desired card is selected by the gate 428 as in the previous embodiment, and is transferred to the drum 416 for processing by the transducer means 420.

The control system for the embodiment of Figure 10 may be similar in most respects to the control system for the embodiment of Figure 1. For example, to operate the system of Figure 10 in the first mode, the vacuum pressure of the selected input stack 402, 404, 406, 408 or 410 is released. Then, the triode 264 in Figure 7 is connected to control all the transfer mechanisms of the input stacks so that, when the switch 252 is depressed, all of the stacks 402, 404, 406, 408 and 410 are placed in condition to feed cards to the periphery of the drum 414. However, only the one of these stacks whose vacuum pressure is released will actually feed the cards to the drum.

Likewise, the triode 274 in Figure 7 may be made to control the transfer mechanism 419 of the output stack 418. Then, when the switch 252 is depressed, the output stack 418 is conditioned to receive cards from the periphery of the drum 414.

Therefore, cards are fed from the selected input stack to the periphery of the drum 414 and are carried by the drum under the mouths of the other input stacks, which are appropriately controlled, as previously noted, to be in their "feed" condition. The cards are then transported in sequence past the transducer means 415 and are fed to the output stack 418. The desired card is transferred to the drum 416 by the gate 428 for processing. The resulting pulse on the lead 246 is supplied through the appropriate selector switch to condition only the selected input stack for stacking.

After the desired card and its trailing cards have been processed on the drum 416, the gate 426 is activated as in the previous embodiment. This causes the desired card and the trailing cards to be returned to the drum 414 and to be transported to the output stack 418. The delay line 270 in Figure 7 now causes the flip-flop 272 to control the output stack 418 so that it is conditioned to feed the cards to the drum 414. The cards in the stack are then successively fed to the drum 414 and returned by it under the mouths of the other stacks back to the selected input stack which, as previously noted, is the only one conditioned to receive and stack the cards.

The embodiment of Figure 10 can also be made to operate in the second mode for utilizing the control system of Figure 9 with the minor changes described above. In the second mode, the active cards become positioned toward the front of its stack so as to minimize the time required to process them.

The system and apparatus of Figure 10, therefore, can be made to operate in the same manner as the system and apparatus of Figure 1. The difference between the two is that a controllable magazine 18 is used in the first embodiment to determine which of a plurality of input stacks 20 shall be placed in an operative position. The embodiment of Figure 10, on the other hand, is controllable so that the selected stack is activated by conditioning its transfer mechanism to feed cards to the drum 414. It will be noted that the delay of the delay line 280 in Figures 7 and 9 must be adjustable so as to correspond to the particular one of the input stacks that is selected. That is because the time for a card to reach the gate 428 varies with the stack selected. The circuits for automatically producing the required delay are shown in Figure 11 and will be described in detail subsequently.

A typical control system for causing the apparatus shown in Figure 10 to work in the first mode is shown in Figure 11. The control circuit of Figure 11 is merely fragmentary. However, it will be understood that circuitry identical to that of the systems of Figures 7 and 9 can be used to cause the comparator 242, as shown in Figure 11, to produce a pulse on the lead 246 when the desired card is reached. In the system of Figure 11, components similar to those of the systems shown in Figures 7 and 9 are represented by like numerals.

In the control system of Figure 11, each of the input stacks has its own flip-flop and its own diode for controlling its transfer mechanism. That is, the differentiator 260 is connected to the left input terminal of each of a series of flip-flops 430, 432, 434, 436 and 438. The left output terminals of these flip-flops are respectively connected to the control grids of a series of triodes 440, 442, 444, 446 and 448. These triodes, like the triode 264 of Figure 7, respectively, control the energizing windings of the transfer mechanisms 403, 405, 407, 409 and 411 respectively associated with the input stacks, and also control the energizing windings 441, 443, 445, 447 and 449 of the solenoid valves respectively associated with the retainers of respective ones of the transfer mechanisms, as in the previous embodiments. Each of these windings is shunted by a switch, such as the switches 451, 453, 455, 457 and 459.

The output lead 246 from the comparator 242 is also connected to the movable arm of a rotary selecting switch 450. The selector switch in the illustrated embodiment has five fixed contacts. These fixed contacts are respectively connected through respective "or" networks 452, 454, 456, 458 and 460 to the right input terminals of the respective flip-flops 430, 432, 434, 436 and 438.

The output lead 246 is also connected to a delay line 456 which, in turn, is connected to the "or" networks 452, 454, 456, 458 and 460. The delay line 270, the flip-flop 272 and the triode 274 of the system of Figure 7 now control the transfer mechanism 419 of the output stack 418.

The delay line 280 of Figure 7 is replaced by five delay lines 280a, 280b, 280c, 280d and 280e. These delay lines are all connected to the flip-flop 282 and to its delay line 284. The flip-flop 282 controls the triode 286, as in the system of Figure 7, and this triode controls the activation of the gate 428.

The lead 246 is selectively connected to the input terminals of respective ones of the delay lines 280a, 280b, 280c, 280d and 280e through a selector switch 453. The selector switch 453 is mechanically coupled to the selector switch 450, as represented by the broken line 454. The delay line 292, the flip-flop 294, its delay line 296, and the triode 298 now control the gate 426.

When the switch 252 is actuated to initiate the system, the pulse from the differentiator 260 triggers the flip-flops 430, 432, 434, 436 and 438 into their "true" states so that the triodes 440, 442, 444, 446 and 448 are all conductive and all the input stacks 402, 404, 406, 408 and 410 are conditioned to feed cards successively to the drum 414. Only the selected input stack, however, whose switch (451, 453, 455, 457 or 459) is open, will have the solenoid valve associated with its retainer energized and open. Therefore, only the selected input stack will actually feed cards to the drum 414. The switches 451, 453, 455, 457 and 459 may be manually operated or they may be mechanically or electrically coupled to the switches 450 and 453 for individual opening in accordance with the positioning of the movable contacts of the switches 450 and 453.

The switches 450 and 453 are simultaneously turned to a position corresponding to the selected input stack. Then, when the desired card is reached and when a pulse appears on the lead 246, only the particular one of the flip-flops 430, 432, 434, 436 and 438 corresponding to that stack is returned to its "false" state. Therefore, only the selected stack is conditioned to interrupt the feed of cards to the drum 414, and to strip cards from the drum 414. Likewise, the proper delay line 280a, 280b, 280c, 280d and 280e is selected by the switch 452 so that the gate 428 is activated as the desired card from the selected input stack approaches that gate.

The operation, therefore, is similar to that of Figure 7, with the desired card and its trailing cards being selected by the gate 428 and transferred to the drum 416. After processing, the triode 298 is rendered conductive so that the gate 426 is activated and the processed card and its trailing cards are returned to the drum 414 to be deposited in the output stack 418. The delay line 270 then renders the triode 274 conductive so that the transfer mechanism 419 associated with the output stack 418 causes the cards to be fed back to the drum 414 and to be returned to the original input stack. As noted above, only the selected input stack is conditioned to receive the cards because only the particular one of the flip-flops 430, 432, 434, 436 and 438 corresponding to that stack was returned to its "false" state. The other input stacks are conditioned to feed cards to the periphery of the drum 414. As previously noted, such feed is prevented because of the vacuum pressure exerted by each of their retainers. The cards, therefore, are able to pass under the transfer mechanisms of the other input stacks and are returned and received by the originally selected input stack.

After all the cards have been returned to the selected input stack, the delay line 456 introduces a pulse through the "or" networks 452, 454, 456, 458 and 460 to the right input terminals of the flip-flops 430, 432, 434, 436 and 438 so that all of the flip-flops are returned to their "false" state and so that all the input stacks are placed in a stacking condition. The delay provided by the line 456 is sufficiently long so that all of the cards can be returned to the input stack even though the processed card may have been the last card in the stack. Then, for the next cycle of operation, none of these input stacks can release a card until its associated one of the switches 451, 453, 455, 457 and 459 is opened, and also until the switch 252 is actuated to return all the flip-flops 430, 432, 434, 436 and 438 to their "true" state.

The control system of Figure 12 is generally similar to that of Figure 11 and enables the apparatus of Figure 10 to operate in the second mode in which the processed card is returned to the selected input stack after the cards from the output stack 418 have been so returned.

In the control system of Figure 12, the left input terminal of the flip-flop 272 is connected to the output terminals of the delay lines 280a, 280b, 280c, 280d and 280e rather than to the delay line 270 of Figure 11. This enables the output stack 418 to be conditioned to return the cards to the selected input stack as soon as the desired card is selected and transferred by the gate 428. This connection is similar to the equivalent connection between the flip-flop 272 and the delay line 280 of Figure 9.

In the control system of Figure 12, the output stack 418 includes a switch 320 similar to the switch 320 of the control system of Figure 9. Then, as in the control system of Figure 9, the flip-flop 294 is actuated to render the triode 298 conductive and activate the gate 426 only when the last card has left the output stack 418. The selected card is then returned by the gate 426 to the drum 414 and by that drum to the selected input stack.

It should be stressed that the binary numbers in the illustrated embodiments are assumed to have three digits merely for convenience of description. It is, of course, apparent that, for more complex systems, more digits would be used and this would necessitate an increase in the number of transducers 415 and a corresponding increase in the components respectively associated with these transducers.

The invention provides therefore, a simple and convenient apparatus and system whereby cards may be selected from an input magazine or other arrangement of plural input stacks and rapidly and accurately selected for processing.

As evident from the foregoing description, the system of the invention is capable of several modes of operation. In one important mode, one of the cards is selected from an input stack, is processed and is automatically returned with the other cards to the input stack so as to retain its original position in the stack. In a second important mode, the cards in the individual stacks are returned with the processed card disposed toward the leading portion of the stack. As previously noted, this causes the most active cards always to be disposed to the front of the various stacks for more rapid and convenient access. It should be noted that this is a dynamic condition in which the less active cards continually drift toward the back of the stack and the more active cards continually are positioned towards the front. On the basis of many hundreds of thousands of cards, this active disposition of the individual cards is capable of materially speeding up the selection and processing operations.

Although this application has been disclosed and illustrated with reference to particular applications, the principles involved are susceptible of numerous other applications which will be apparent to persons skilled in the art. The invention is, therefore, to be limited only as indicated by the scope of the appended claims. For example, it will be appreciated that the term "card" as used in the claims is intended to cover any type of discrete element which is capable of storing information and subsequently obtaining a reproduction of such information.

We claim:

1. In apparatus for processing information on information cards, the combination of: means constructed to hold information cards, transport means for the cards, means disposed relative to the cards in the holding means for obtaining a sequential transfer of cards from the holding means to the transport means, transducing means operative upon the cards transferred from the holding means to the transport means for sensing particular information on such cards, means responsive to the information sensed by the transducing means for terminating the transfer of cards from the holding means to the transport means when particular information is sensed on one of the cards by the transducing means, and means responsive to the termination in the transfer of cards from the holding means for obtaining a consolidation of the cards transferred from the holding means and the cards remaining in the holding means at the time of termination in the transfer of the cards from the holding means.

2. In apparatus for processing information on cards, the combination of: means constructed to hold information cards, transport means for the cards, means disposed relative to the cards in the holding means for obtaining a sequential transfer of cards between the holding means and the transport means, transducing means responsive to particular information on the transported cards to sense such information, means responsive to the information sensed by the transducing means for obtaining a termination in the transfer of cards from the holding means to the transport means when desired information is sensed on a particular card by the transducing means, and means including the transport means and operative upon the termination in the transfer of cards from the holding means to the transport means for obtaining a return to the holding means of the cards previously transferred from the holding means to the transport means.

3. In apparatus for processing information on information cards, the combination of: transport means for the cards, means constructed to hold information cards, means disposed relative to the cards in the holding means for obtaining a sequential transfer of information cards between the holding means and the transport means, transducing means responsive to particular information on the transported cards for sensing such particular information, means responsive to the information sensed by the transducing means for obtaining a termination between the transfer of cards from the holding means and the transport means when desired information is sensed on a particular card by the transducing means, means responsive to the desired information on the particular card for processing information on the particular card, and means responsive to the processing of the information on the particular card for obtaining a return to the holding means of the cards transferred to the transport means from the holding means and for obtaining a transport of such cards for the consolidation of such cards and the cards still remaining in the holding means at the time of termination in the transfer of cards from the holding means to the transport means.

4. In apparatus for processing information on information cards, the combination of: transport means for the cards, means constructed to hold information cards in stacked relationship, means disposed relative to the holding means and the transport means for obtaining a controlled transfer of cards between the holding means and the transport means, transducing means responsive to particular information on the transported cards for sensing such particular information, means responsive to the particular information sensed on the transported cards for terminating the transfer of cards from the holding means to the transport means when desired information is sensed on a particular one of the transported cards, means coupled to the transducing means for processing information on the particular card, and means responsive to the processing of information on the particular card for obtaining a consolidation of at least some of the cards previously transferred to the transport means from the holding means with the cards still remaining in the holding means at the time of processing of information on the particular card.

5. In apparatus for processing information on information cards, the combination of: movable transport means constructed to provide a movement of the cards with the transport means, means constructed to hold the cards in stacked relationship, transfer means disposed relative to the holding means and the transport means for obtaining a controlled transfer of cards between the holding means and the transport means, transducing means responsive to particular information on the transported cards for sensing such information, control means responsive to the particular information sensed by the transducing means for operating upon the transfer means to obtain a termination in the transfer of cards from the holding means to the transport means when desired information is sensed by the transducing means on a particular one of the transported cards, means responsive to the desired information on the particular card for processing information on the particular card, and means responsive to the desired information on the particular card for obtaining a return to the holding means of the cards previously transferred from the holding means to the transport means and including the particular card.

6. In apparatus for processing information on information cards, the combination of: transport means movable in a closed loop and constructed to obtain a movement of the cards with the transport means, means constructed to hold information cards in a stacked relationship, transfer means disposed relative to the transport means and to the holding means for providing a controlled transfer of cards between the holding means and the transport means, transducing means responsive to particular information on the transported cards to sense such information, control means responsive to the particular information sensed by the transducing means for operating on the transfer means to obtain a termination in the transfer of cards from the holding means to the transport means when desired information is sensed by the transducing means on a particular one of the transported cards, means responsive to the desired information on the particular card for processing information on the particular card, and means responsive to the desired information on the particular card for operating upon the transfer means to obtain a return to the holding means of such card and the other cards previously transferred to the transport means from the holding means and to obtain a consolidation in the holding means of such cards in their original order with the cards retained in the holding means.

7. In apparatus for processing information on information cards, the combination of: a rotatable vacuum transporting drum constructed to retain the cards in fixed position on the drum during the drum rotation, means constructed to hold cards in stacked relationship, transfer means disposed relative to the holding means and the transporting drum for obtaining a controlled transfer of cards between the holding means and the drum, transducing means responsive to particular information on the transported cards to sense such particular information, control means responsive to the particular information sensed by the transducing means on the transported cards for interrupting the transfer of cards from the holding means to the transporting drum when desired information is sensed by the transducing means on a particular one of the transported cards, means responsive to the desired information on the particular card for processing information on the particular card, means responsive to the desired information on the particular card for operating upon the transfer means to obtain a return to the holding means of the cards transferred from the holding means to the transporting drum prior to the transfer to the transporting drum of the particular card, and means responsive to the return of the other cards to the holding means for subsequently obtaining a return to the holding means of the particular card.

8. In apparatus for processing information on information cards, the combination of: means constructed to hold cards, transport means for the cards, transfer means disposed relative to the cards in the holding means for obtaining a controlled transfer of cards from the holding means to the transport means, transducing means responsive to particular information on the transported cards to sense such information, means responsive to the particular information sensed by the transducing means on the transported cards for obtaining a termination in the transfer of cards from the holding means to the transport means when desired information is sensed by the transducing means on a particular one of the transported cards, means responsive to the desired information on the particular card for processing information on such card, and means responsive to the desired information on the particular card for bringing the processed card into stacked relationship with the cards previously transferred to the transport means from the holding means.

9. In apparatus for processing information on information storage cards, the combination of: first transport means movable in a closed loop and constructed to obtain a movement of cards with the transport means, second transport means movable in a closed loop and constructed to obtain a movement of cards with the second transport means, first means constructed to hold cards in stacked relationship, second means constructed to hold cards in stacked relationship, first transducer means disposed relative to said first transport means for sensing particular information on the cards on the first transport means, gating means responsive to the information sensed by the first transducer means for obtaining a transfer of a particular one of the cards from the first transducer means to the second transducer means in accordance with such sensed information and for subsequently obtaining a return of the particular card to the first transport means, second transducer means disposed relative to the second transport means for processing information on the particular card transferred to the second transport means, transfer means operatively coupled to the first holding means and to the first transport means for obtaining a transfer of cards between the holding means and the first transport means, and means coupled to the first transducer means for operating on the transfer means to obtain a transfer of cards from the holding means to the first transport means until the transfer of the particular card to the first transport means and for thereafter obtaining a transfer to the holding means of the cards previously transferred to the first transport means from the holding means.

10. In apparatus for processing information on information cards, the combination of: first means constructed to hold cards in stacked relationship, first transport means for the cards, first transducer means disposed relative to the cards on the transport means to sense particular information on such cards, second transport means for the cards, gate means responsive to the information sensed by the transducer means on the cards on the first transport means for obtaining a transfer of a particular one of the cards from the first transport means to the second transport means in accordance with such sensed information, second transducer means disposed relative to the second transport means for processing information on the particular card transferred to the second transport means, second means constructed to hold cards in stacked relationship, first transfer means operatively coupled to the first holding means and to the first transport means for obtaining a controlled transfer of cards between the first holding means and the first transport means, second transfer means operatively coupled to the second holding means and the first transport means for obtaining a controlled transfer of cards between the first transport means and the second holding means, and control means responsive to the information sensed by the first transducer means and to the information processed by the second transducer means for operating upon the first and second transfer means to initially obtain a transfer of cards by the first transport means from the first holding means to the second holding means until the transfer of the particular card from the first holding means to the first transport means and to subsequently obtain a return of the cards in the second holding means by the first transport means to the first holding means.

11. In apparatus for processing information on information cards, the combination of: first transport means for the cards, first transducer means disposed relative to the first transport means to sense particular information on the cards on the first transport means, first means constructed to hold cards in stacked relationship, first transfer means operatively coupled to the first transport means and to the first holding means for obtaining a controlled transfer of cards between the first holding means and the first transport means, second means constructed to hold cards in stacked relationship, second transfer means operatively coupled to the first transport means and the second holding means for obtaining a controlled transfer of cards between the first transport means and the second holding means, second transport means for the cards, gate means disposed relative to the first and second transport means to obtain a transfer of cards between the first and second transport means, first control means responsive to the information sensed by the first transducer means for operating upon the first and second transfer means to obtain a transfer of cards by the first transport means from the first holding means to the second holding means until the sensing of desired information by the first transducer means on a particular one of the cards on the first transport means, second control means responsive to desired information on the particular card on the first transport means for obtaining an operation of the gate means to produce a transfer of the particular card from the first transport means to the second transport means, and third control means responsive to the transfer to the second transport means of the particular card for operating upon the first and second transfer means to obtain a return of the cards by the first transport means from the second holding means to the first holding means.

12. The apparatus defined in claim 11 in which the second control means operates on the gate means to obtain a transfer to the second transport means from the first transport means of at least one additional card trailing the particular card and in which muting control means are coupled to the second transducer means for causing the second transducer means to only process information from the particular card.

13. In apparatus for processing information on information cards, the combination of: first means constructed to hold cards in stacked relationship, second means constructed to hold cards in stacked relationship, first transport means disposed relative to the first and second holding means to receive cards from the holding means and constructed to obtain a movement of such cards in the order of their removal from the holding means, first transducer means disposed relative to the cards on the first transport means to sense particular information on such cards, second transport means constructed to obtain a movement of the cards, gate means disposed relative to the first and second transport means and constructed to obtain a transfer of cards between the first and second transport means, first transfer means disposed relative to the first holding means and to the first transport means for obtaining a transfer of cards between the first holding means and the first transport means, second transfer means disposed relative to the second holding means and the first transport means to obtain a transfer of cards between the second holding means and the first transport means, first control means responsive to the information sensed by the first transducer means for operating upon the first and second transfer means to obtain a transfer of cards by the first transport means from the first holding means to the second holding means and for terminating such transfer upon the sensing by the first transducer means of desired information on a particular card, second control means responsive to the sensing of the desired information on the particular card for operating upon the gate means to obtain a transfer of the particular card from the first transport means to the second transport means, second transducer means disposed relative to the second transport means for processing information on the particular card upon the transfer of the card to the second transport means, and third control means responsive to the termination in the transfer of cards from the first holding means to the second holding means for operating upon the first and second transfer means to obtain a return of the cards in the second holding means by the first transport means to the first holding means and for operating on the gate means to obtain a return of the particular card from the second transport means to the first holding means for movement of the card to the first holding means.

14. In apparatus for processing information on information cards, the combination of: first means constructed to hold cards in stacked relationship, second means constructed to hold cards in stacked relationship, transport means constructed to obtain a movement of the cards and disposed relative to the first and second holding means to obtain a movement of the cards between the holding means, transducer means disposed relative to the cards on the transport means for sensing particular information on such cards, first transfer means operatively coupled to the first holding means and to the transport means for obtaining a transfer of cards between the transport means and the first holding means, second transfer means operatively coupled to the second holding means and to the transport means for obtaining the transfer of cards between the transport means and the second holding means, first control means responsive to the particular information sensed on the cards by the transducer means for operating upon the first and second transfer means to obtain a transfer of cards by the transport means from the first holding means to the second holding means, second control means responsive to the particular information sensed on the transported cards by the transducing means for operating upon the first transfer means to obtain a termination in the transfer of cards from the first holding means to the second holding means when desired information is sensed by the transducing means on a particular one of the transported cards, third control means responsive to the termination in the transfer of cards from the first holding means to the second holding means for operating upon the first and second transfer means to obtain a transfer of cards from the second holding means to the transport means for movement into the first holding means, and fourth control means responsive to the transfer of the cards from the second holding means to the first holding means for obtaining a return of the particular card by the transport means to the first holding means.

15. In apparatus for processing information on information cards, the combination of: transport means for the cards, means constructed to hold cards in stacked relationship, transfer means disposed relative to the transport means and the holding means for obtaining a sequential transfer of cards from the holding means to the transport means, means responsive to particular information on the transported card for processing information on one of the transported cards having desired values for the particular information sensed by the transducing means, means responsive to the particular information on the particular card for causing the cards other than the particular card to be returned to the holding means, and means operative upon the return to the holding means of the cards other than the particular card for subsequently causing the particular card to be returned by the transport means to the holding means.

16. In a system for processing information on information cards, the combination of: means constructed to hold information cards in stacked relationship, transport means for the cards, transfer means disposed relative to the holding means and the transport means to provide a controlled transfer of cards between the holding means and the transport means, means responsive to particular information on the transported cards for sensing a particular card having a desired value for the particular information, and means responsive to the particular information on the particular card for operating upon the transfer means to obtain a return of such card by the transport means to a leading position in the holding means.

17. In a system for processing information on information cards, the combination of: movable transport means constructed to provide a movement of the cards with the transport means, a holder for such cards and positioned relative to the transport means to obtain a transfer of cards between the transport means and the holder, means disposed relative to the cards in the card holder for providing a transfer of such cards between the card holder and the transport means, means responsive to particular information on the cards for selecting at least a particular one of the transported cards in accordance with the particular information on such particular card, means responsive to the particular information on the particular card for operating upon the transfer means to obtain a return to the card holder of the other cards previously transferred to the transport means from the card holder, and means operative upon the processing of the particular card for subsequently causing the particular card to be returned by the transport means to the card holder.

18. In apparatus for processing information cards, the combination of: transport means movable in a closed loop and constructed to obtain a movement of the cards, a first holder for such information cards and positioned relative to the transport means to obtain a transfer of cards between the card holder and the transport means, first transfer means disposed relative to the first card holder and the transport means for obtaining a controlled transfer of cards between the first card holder and the transport means, a second card holder disposed relative to the transport means to obtain a controlled transfer of cards between the second card holder and the transport means, transfer means disposed relative to the second card holder and to the transport means for obtaining a controlled transfer of cards between the second card holder and the transport means, first means disposed relative to the first and second transfer means for obtaining a transfer of cards from the first card holder to the transport means for movement of the cards to the second card holder, means responsive to particular information on the transported cards for processing information on at least a particular one of the transported cards in accordance with the particular information on the particular card, means responsive to the particular information on the particular card for operating upon the first and second transfer means to obtain a transfer of the cards in the second card holder to the transport means for movement to the first card holder, and means responsive to the return of the cards from the second card holder to the first card holder for subsequently causing the particular card to be returned by the transport means to the first card holder.

19. In apparatus for processing information on information cards, the combination of: a transport drum constructed to retain cards on the periphery of the drum and to obtain a movement of the cards with the drum, a first card holder constructed to hold information cards in stacked relationship and positioned relative to the periphery of the drum to obtain a transfer of cards between the first card holder and the periphery of the drum, first transfer means disposed relative to the cards in the first card holder for obtaining a controlled transfer of cards between the first card holder and the periphery of the drum, a second card holder constructed to hold information cards in stacked relationship and positioned relative to the periphery of the drum to obtain a transfer of cards between the second card holder and the periphery of the drum, second transfer means disposed relative to the transported cards for obtaining a controlled transfer of the cards from the drum to the second card holder, means responsive to particular information on the transported cards for selecting a particular one of the cards on the drum for processing in accordance with the particular information on the card, means responsive to the particular information on the particular card on the drum for obtaining a termination in the transfer of the cards from the first card holder to the drum, means responsive to the particular information on the particular card for causing the particular card to be returned by the drum to the first card holder, and means responsive to the return of the particular card to the card holder for operating upon the first and second transfer means to obtain a return of the cards in the second card holder by the drum to the first card holder.

20. In apparatus for processing information on information cards, the combination of: a first rotatable vacuum transport drum constructed to retain cards on the periphery of the drum and to obtain a movement of the cards with the drum, a first card holder constructed to hold information cards in stacked relationship, first transfer means disposed relative to the first drum and the first card holder for obtaining a controlled transfer of information cards between the first card holder and the periphery of the drum, a second card holder constructed to hold cards in stacked relationship, second transfer means disposed relative to the second card holder and the drum for obtaining a controlled transfer of cards between the second card holder and the periphery of the drum, a second rotatable vacuum transport drum constructed to hold cards in fixed position on the periphery of the drum and to obtain a movement of the cards with the drum, gate means disposed relative to the first and second drums and responsive to particular information on the cards transferred to the first drum for obtaining a transfer of a particular one of the cards from the first drum to the second drum in accordance with particular information on the selected card, means disposed relative to the periphery of the second drum for processing information on the particular card on the second drum, means responsive to the transfer of the particular card to the second drum for terminating the transfer of cards from the first card holder to the first drum, means operative upon the termination in the transfer of cards from the first card holder to the first drum for operating upon the first and second transfer means to obtain a return of the cards in the second card holder by the first drum to the first card holder while the particular card is on the periphery of the second drum, and means operative upon the return of the cards in the second card holder to the first card holder for operating upon the gate means to cause the particular card to be returned to said first drum and to the first card holder and to be established in a leading position in the first card holder.

21. In apparatus for processing information on information cards, the combination of: a magazine including a plurality of individual card holders each constructed to hold information cards in stacked relationship, transport means for the cards, control means disposed relative to the magazine for positioning the individual card holders of the magazine in coupled relationship to the transport means, transfer means operative upon the cards in the card holder coupled to the transport means for obtaining a controlled transfer of cards in the card holder to the transport means, means responsive to particular information on the cards transferred to the transport means for selecting at least one of the cards on the transport means for processing in accordance with the particular information on the card, means responsive to the particular information on the particular card on the transport means for causing the other cards previously transferred to the transport means from the coupled card holder to be returned to the coupled card holder, and means responsive to the return of the other cards to the coupled card holder for subsequently causing the particular card to be returned to the coupled card holder and established in a leading position in the card holder.

22. In apparatus for processing information cards, the combination of: transport means for the cards, a plurality of card holders each constructed to hold information cards in stacked relationship, transfer means disposed relative to the transport means and an individually coupled card holder in the plurality for providing a transfer of information cards between the transport means and the individually coupled card holder in the plurality in accordance with the positioning of the individually coupled card holder, means responsive to particular information on the cards transferred from the particular card holder to the transport means for selecting a particular one of the cards on the transport means for processing in accordance with the particular information on the card, means responsive to the particular information on the particular card for causing the other cards previously transferred to the transport means from the individually coupled card holder to be returned to the individually coupled card holder, and means responsive to the return of the other cards to the individually coupled card holder for causing the particular card to be returned to the individually coupled card holder and to be established in a leading position in the individually coupled card holder.

23. In apparatus for processing information cards, the combination of: a plurality of individual card holders each constructed to hold information cards, a rotatable vacuum transport drum constructed to hold cards in fixed position on the periphery of the drum for movement with the drum, first transfer means disposed relative to the transport means to obtain a transfer of cards from the transport means to a particular card holder coupled in the plurality to the transport means, a second card holder constructed to hold cards in stacked relationship and disposed relative to the periphery of the drum to obtain a transfer of cards between the second card holder and the periphery of the drum, second transfer means disposed relative to the transport drum for obtaining a controlled transfer of cards between the transport drum and the second card holder, means responsive to particular information on the transported cards for selecting a particular one of the cards on the drum for processing in accordance with the particular information on the card, means responsive to the particular information on the particular card for obtaining an interruption in the transfer of the cards to the drum from the coupled card holder in the plurality, means operative upon the interruption in the transfer of the cards to the drum from the coupled card holder in the plurality for causing the cards in the second card holder to be returned by the drum to the coupled card holder in the plurality, and means operative upon the return of the cards in the second card holder to the coupled card holder in the plurality for causing the particular card to be returned by the drum to the coupled card holder in the plurality and to be established in a leading position in the coupled card holder in the plurality.

24. In apparatus for processing information cards, the combination of: a plurality of card holders each constructed to hold information cards in stacked relationship, a rotatable vacuum transport drum constructed to obtain a movement of cards with the drum, first transfer means disposed relative to the drum for obtaining a transfer of information cards between the periphery of the drum and a particular one of the card holders in the plurality in accordance with the disposition of the card holders in the plurality relative to the drum, a second card holder constructed to hold information cards in stacked relationship, second transfer means disposed relative to the transport drum for obtaining a controlled transfer of cards between the drum and the second card holder, means responsive to particular information on the cards on the drum for obtaining a selection of a particular one of the cards on the drum for processing, means responsive to the particular information on the particular card for terminating the transfer of cards to the drum from the particular card holder in the plurality, means responsive to the termination in the transfer of cards from the particular card holder in the plurality to the drum for operating upon the first transfer means to obtain a return of the particular card to the particular card holder in the plurality after the processing of the card, and means responsive to the return of the particular card to the particular card holder in the plurality for operating upon the second transfer means to obtain a return of the cards in the second card holder to the particular card holder in the plurality.

25. In apparatus for processing information on information cards, the combination of: a multi-stack magazine including a plurality of individual card holders each constructed to hold information cards in stacked relationship, a rotatable vacuum transport drum constructed to hold cards in fixed position on the periphery of the drum and to obtain a movement of the cards with the drum, control means disposed relative to the magazine for obtaining a selective positioning of the individual card holders of the magazine adjacent the periphery of said drum to obtain a transfer of cards between the drum and the particular card holder adjacent the periphery of the drum, first transfer means disposed relative to the drum and the particular card holder in the plurality for obtaining a controlled transfer of information cards between the particular card holder in the plurality and the periphery of the drum, a second card holder positioned relative to the periphery of the drum to obtain a transfer of cards between the drum and the second card holder, second transfer means disposed relative to the second card holder and the periphery of the drum for obtaining a controlled transfer of cards from the drum to the second card holder, means responsive to particular information on the cards transported by the drum for selecting a particular one of the cards from the drum for processing, means responsive to the particular information on the particular card for terminating the transfer of cards from the particular card holder in the plurality to the drum, means responsive to the termination in the transfer of cards from the particular card holder in the plurality to the drum and responsive to the processing of the particular card for operating upon the first transfer means to obtain a return of the particular card to the particular card holder in the plurality, and means responsive to the return of the particular card to the particular card holder in the plurality for operating upon the second transfer means to obtain a return of the cards in the second card holder to the particular card holder in the plurality.

26. In apparatus for processing information on information cards, the combination of: a first rotatable vacuum transport drum constructed to hold cards on the periphery of the drum for movement with the drum, a first holder for the information cards, first transfer means operatively coupled to the first drum and the first holder for obtaining a controlled transfer of information cards between the first holder and the periphery of the drum, a second card holder for the information cards, second transfer means operatively coupled to the first drum and the second holder for obtaining a controlled transfer of cards between the drum and the second card holder, a second rotatable vacuum transport drum constructed to hold cards on the vacuum drum for movement with the drum, gate means disposed in coupled relationship to the first and second drums and responsive to particular information on the cards on the first drum for obtaining a transfer of at least a particular one of the cards from the first drum to the second drum in accordance with the particular information on the particular card, and means responsive to the transfer of the particular card to the second drum for operating upon the first and second transfer means to cause the cards transferred to the second drum and to the second card holder to be returned to the first drum for movement by the first drum to the first card holder.

27. In apparatus for processing information on information cards, the combination of: a first rotatable vacuum transport drum constructed to hold cards in fixed position on the drum during the drum rotation, a first holder for the cards and positioned adjacent the periphery of the drum and having a first transfer mechanism associated with the card holder to obtain a transfer of cards successively between the first holder and the periphery of the drum, a second holder for the cards and positioned adjacent the periphery of the first drum and having a second transfer mechanism associated with the drum to obtain a controlled transfer of cards between the first drum and the second holder, means operatively coupled to the first and second transfer mechanisms for obtaining a transfer of cards in the first card holder by the first drum to the second card holder, a second rotatable vacuum transport drum constructed to hold cards in fixed position on the drum during the drum rotation, gate means disposed in coupled relationship to the first and second drums for obtaining a transfer of cards from each of the drums to the other, means responsive to particular information on the cards on the first drum for causing the gate means to transfer at least a particular one of the cards from the first drum to the second drum in accordance with the particular information on the particular card, and means responsive to the transfer of the particular card from the first drum to the second drum for conditioning the first and second transfer mechanisms to obtain a transfer of the cards in the second holder to the periphery of the first drum and for conditioning the gate means to obtain a return of the card from the second drum to the first drum for a return of the cards to the first holder.

28. In apparatus for processing information on information cards, the combination of: a first rotatable vacuum transport drum constructed to hold cards in fixed position on the drum during the drum rotation, a card holder constructed to hold cards in stacked relationship, transfer means disposed relative to the card holder and the drum for obtaining a transfer of information cards in sequence between the drum and the card holder, a second rotatable vacuum transport drum constructed to hold cards in fixed position on the drum during the drum rotation, gate means disposed in coupled relationship to the first and second drums for obtaining a transfer of cards from each of the drums to the other, control means responsive to particular information on the cards on the first drum for causing the gate means to obtain a transfer of a particular one of the cards from the first drum to the second drum in accordance with the particular information on the particular card, means responsive to the transfer of the particular card to the second drum for operating upon the transfer means to obtain a return of the cards other than the selected card in sequence to the card holder, and control means responsive to the return of the cards to the card holder for operating upon the gate means to obtain a return of the particular card to the first drum for transfer into the card holder.

29. In a system for processing information on information cards, the combination of: a rotatable vacuum transport member constructed to hold cards in fixed position on the periphery of the member during the rotation of the member, means coupled to the transport member for obtaining a controlled transfer of information cards in sequence to the peripheral surface of the member, means responsive to particular information on the transported cards for selecting a particular one of the cards on the transport member, means operative upon the selection of the particular card for causing the cards other than the particular card to be returned in sequence to the transfer means, and means operative upon the return of the other cards to the transfer means for causing the particular card to be returned to the transfer means.

References Cited in the file of this patent

UNITED STATES PATENTS

| | | |
|---|---|---|
| 2,379,828 | Rubidge | July 3, 1945 |
| 2,579,281 | Tuck | Dec. 18, 1951 |
| 2,795,328 | Tyler et al. | June 11, 1957 |